United States Patent
Goto

(10) Patent No.: US 8,993,188 B2
(45) Date of Patent: Mar. 31, 2015

(54) FUEL CELL AND SEPARATOR CONSTITUTING THE SAME

(75) Inventor: Sogo Goto, Suntou-gun (JP)

(73) Assignee: Toyota Jidosha Kabushiki Kaishi, Toyota-Shi (JP)

(*) Notice: Subject to any disclaimer, the term of this patent is extended or adjusted under 35 U.S.C. 154(b) by 1030 days.

(21) Appl. No.: 12/523,132

(22) PCT Filed: Jan. 28, 2008

(86) PCT No.: PCT/IB2008/000183
§ 371 (c)(1),
(2), (4) Date: Jul. 14, 2009

(87) PCT Pub. No.: WO2008/093200
PCT Pub. Date: Aug. 7, 2008

(65) Prior Publication Data
US 2010/0009238 A1    Jan. 14, 2010

(30) Foreign Application Priority Data
Jan. 29, 2007   (JP) ................. 2007-018063

(51) Int. Cl.
*H01M 2/38*   (2006.01)
*H01M 8/02*   (2006.01)
(Continued)

(52) U.S. Cl.
CPC ........ *H01M 8/0258* (2013.01); *H01M 8/04089* (2013.01); *H01M 8/2465* (2013.01); *H01M 8/0265* (2013.01); *H01M 2008/1095* (2013.01); *Y02E 60/50* (2013.01)
USPC ...................................... 429/454

(58) Field of Classification Search
CPC .......... H01M 8/0204–8/0213; H01M 8/0258–8/0265; H01M 8/2465
USPC ............................. 429/452, 454–457
See application file for complete search history.

(56) References Cited

U.S. PATENT DOCUMENTS 3,468,712 A * 9/1969 Gillespie ............... 429/434
6,117,577 A   9/2000 Wilson
(Continued)

FOREIGN PATENT DOCUMENTS

CA   2 444 246 A1   11/2002
DE   10048331 A1    11/2001
(Continued)

OTHER PUBLICATIONS

"Overlap." Merriam-Webster. Merriam-Webster, n.d. Web. Nov. 30, 2012. <http://www.merriam-webster.com/dictionary/overlap>.*
(Continued)

*Primary Examiner* — Edu E Enin-Okut
(74) *Attorney, Agent, or Firm* — Kenyon & Kenyon LLP

(57) ABSTRACT

Each separator of a fuel cell stacked alternately with the power generation bodies has a first surface facing the first electrode of the power generation body, a second surface facing the second electrode of another power generation body, a first reactant gas channel that supplies or discharges a first reactant gas to or from the first electrode and that extends in the separator and has an opening portion opened in the first surface, and a second reactant gas channel that supplies and discharges a second reactant gas to or from the second electrode facing the second surface and that extends in the separator and has an opening portion opened in the second surface. The opening portion of the first reactant gas channel and the opening portion of the second reactant gas channel are both disposed along a first portion of a peripheral border of a power generation region.

11 Claims, 16 Drawing Sheets

(51) Int. Cl.
  *H01M 8/04* (2006.01)
  *H01M 8/24* (2006.01)
  *H01M 8/10* (2006.01)

(56) References Cited

U.S. PATENT DOCUMENTS

| | | | |
|---|---|---|---|
| 2002/0119359 A1* | 8/2002 | Yamazaki et al. | 429/32 |
| 2004/0157103 A1* | 8/2004 | Takeguchi et al. | 429/32 |
| 2005/0035560 A1 | 2/2005 | Segawa et al. | |
| 2006/0003206 A1 | 1/2006 | Sugiura | |
| 2007/0003816 A1 | 1/2007 | Sugita et al. | |
| 2008/0280177 A1* | 11/2008 | Ose et al. | 429/24 |

FOREIGN PATENT DOCUMENTS

| | | | | |
|---|---|---|---|---|
| DE | 60301036 | T2 | 6/2006 | |
| EP | 1 826 857 | A1 | 8/2007 | |
| JP | 04-267062 | A | 9/1992 | |
| JP | 5-109415 | A | 4/1993 | |
| JP | 08045517 | A | 2/1996 | |
| JP | 09265993 | A | 10/1997 | |
| JP | 11067258 | A * | 3/1999 | H01M 8/24 |
| JP | 2001-325968 | A | 11/2001 | |
| JP | 2003331850 | A | 11/2003 | |
| JP | 2004-006104 | A | 1/2004 | |
| JP | 2004331786 | A | 11/2004 | |
| JP | 2005-294083 | A | 10/2005 | |
| JP | 2006131830 | A | 5/2006 | |
| JP | 2006-173123 | A | 6/2006 | |
| JP | 2006-216492 | A | 8/2006 | |
| JP | 2006-221955 | A | 8/2006 | |
| JP | 2006216492 | A * | 8/2006 | H01M 8/02 |
| WO | 0243172 | A1 | 5/2002 | |
| WO | WO 2006/062242 | A1 | 6/2006 | |
| WO | WO 2007043636 | A1 * | 4/2007 | H01M 8/02 |
| WO | WO 2007083214 | A1 * | 7/2007 | H01M 8/02 |
| WO | WO 2007/105046 | A2 | 9/2007 | |

OTHER PUBLICATIONS

Canadian Office Action dated Jun. 1, 2011 of CA 2,675,656.
Office Action drafted Mar. 3, 2011 in related Canadian Application No. 2,672,969.
Japanese Office Action of JP 2007-018063 issued May 8, 2012 and Partial Translation thereof.

* cited by examiner

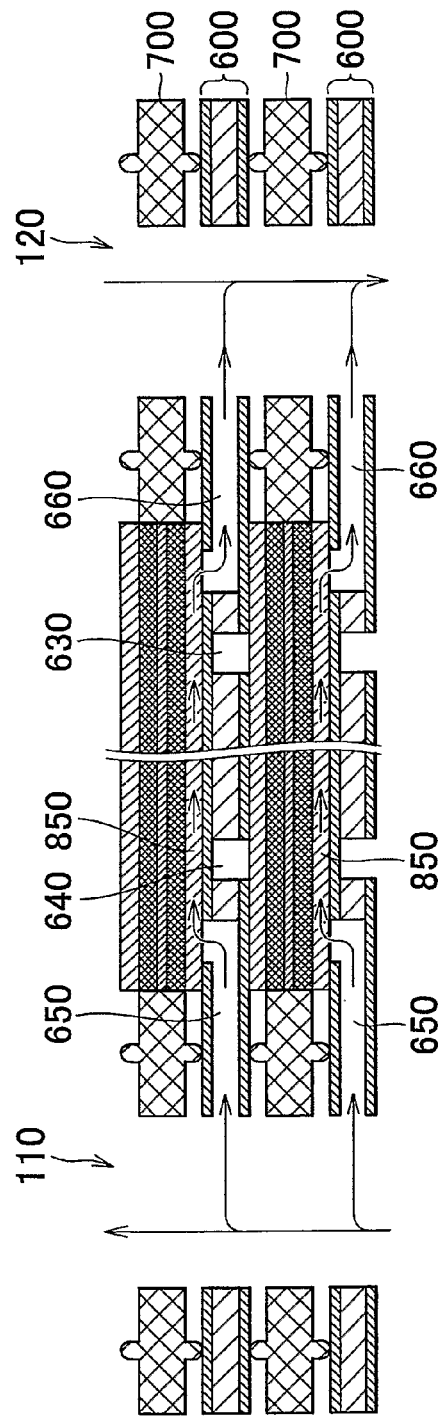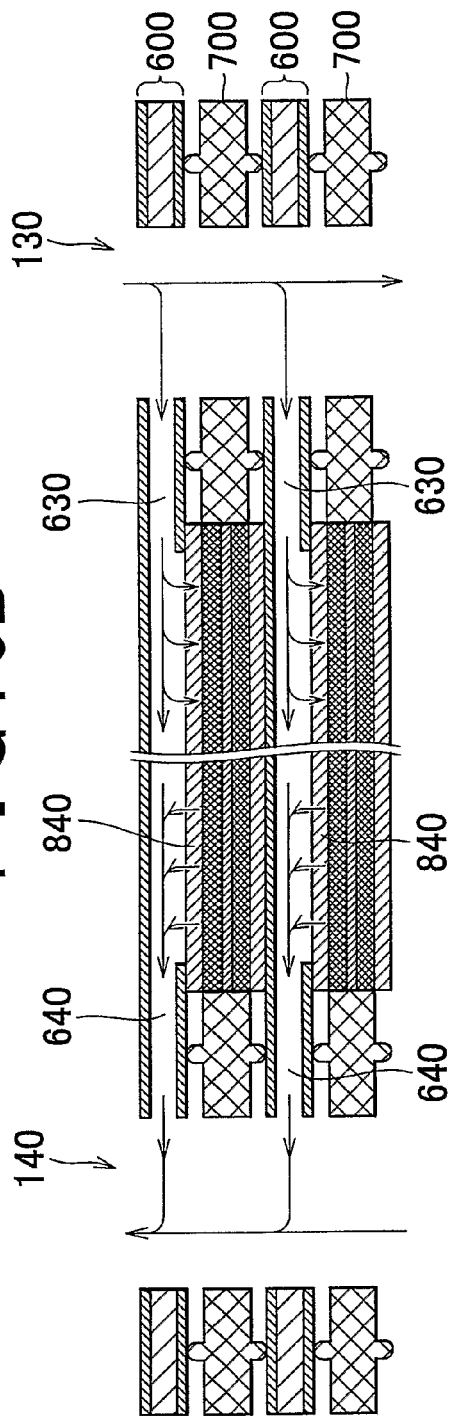

F I G . 13
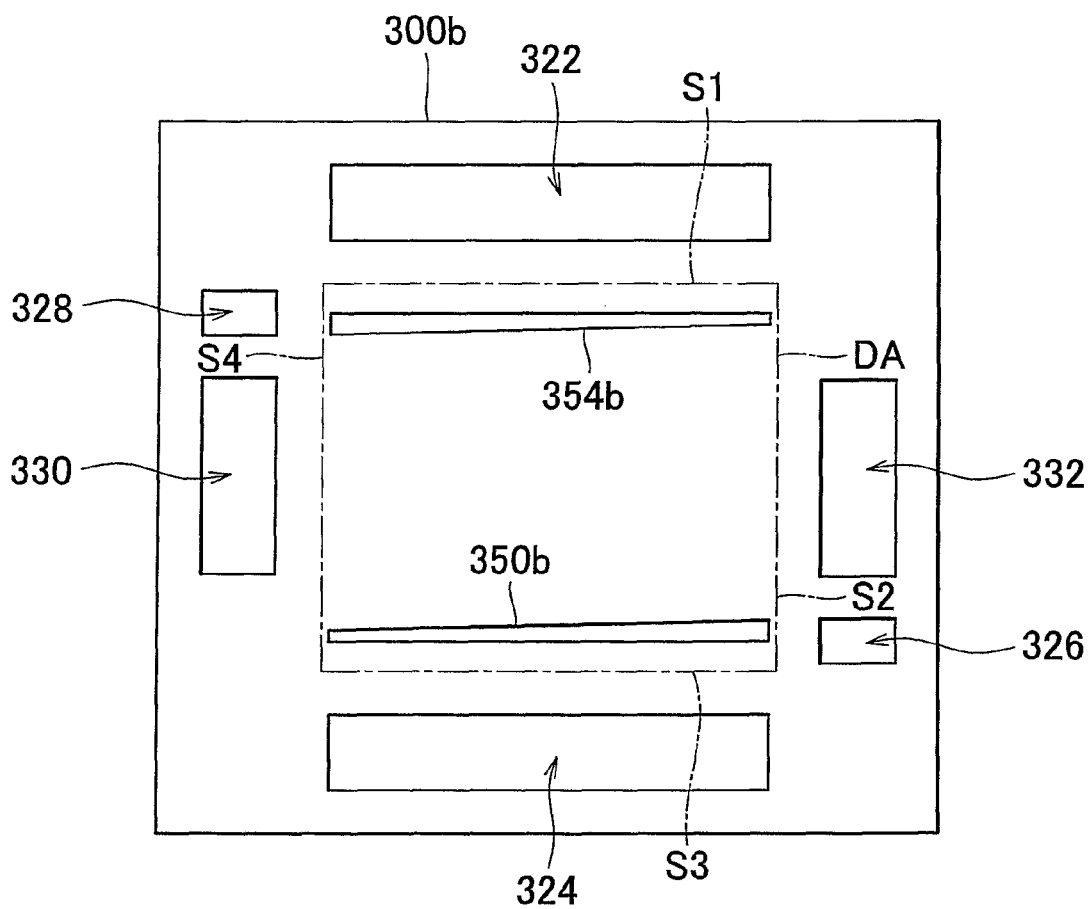

FUEL CELL AND SEPARATOR CONSTITUTING THE SAME

This is a 371 national phase application of PCT/IB2008/000183 filed 28 Jan. 2008, claiming priority to Japanese Patent Application No. 2007-018063 filed 29 Jan. 2007, the contents of which are incorporated herein by reference.

BACKGROUND OF THE INVENTION

1. Field of the Invention

The invention relates to a fuel cell, and a separator that constitutes the fuel cell. In particular, the invention relates to the supply and discharge of reactant gases.

2. Description of the Related Art

Fuel cells, for example, a solid polymer fuel cell, convert chemical energy of substances directly into electric energy by supplying reactant gases (a fuel gas containing hydrogen, and an oxidizing gas containing oxygen) to two electrodes (a fuel electrode and an oxygen electrode) that face each other across an electrolyte membrane so as to cause electrochemical reactions. A known major structure of such fuel cells is a so-called stack structure in which laminate members that include generally platy electrolyte membranes are stacked alternately with separators, and are fastened together in the stacking direction.

A known fuel cell having a stack structure incorporates separators having internal channels that are substantially perpendicular to the thickness direction (e.g., Japanese Patent Application Publication No. 5-109415 (JP-A-5-109415)). In such a fuel cell, the internal channels of the separators are used to supply the reactant gases to or discharge them from the electrodes. In such separators, the aforementioned internal channels are formed by stacking three plate members. An end of such an internal channel links in communication to a reactant gas manifold that penetrates through the separator in the thickness direction, and another end of the internal channel reaches an electrode-facing surface of the separator. Via such internal channels, the reactant gases are transferred between the reactant gas manifolds and the electrodes.

However, in the foregoing related art, an internal channel for one of the two reactant gases, that is, the oxidizing gas, is provided along opposite two sides of the four sides of a generally rectangular power generation region, and a channel for the other reactant gas, that is, the fuel gas, is provided along the other two sides. Therefore, in the power generation region, the oxidizing gas and the fuel gas flow in directions that are both planar directions of the electrolyte membrane and that intersect with each other. This flowage of the reactant gases does not necessarily provide good power generation performance. Thus, a flowage thereof that provides better power generation performance is desired to be realized.

SUMMARY OF THE INVENTION

It is an object of the invention to improve the power generation performance of the fuel cells.

A fuel cell in accordance with a first aspect of the invention includes a plurality of power generation bodies and a plurality of separators. Each of the power generation bodies has a first electrode and a second electrode. Each separator has: a first surface that faces the first electrode of one of the power generation bodies; a second surface that faces the second electrode of another one of the power generation bodies; a first reactant gas channel for supplying or discharging a first reactant gas to or from the first electrode facing the first surface; and a second reactant gas channel for supplying or discharging a second reactant gas to or from the second electrode facing the second surface. The first reactant gas channel extends in the separator, and has, at an end thereof, an opening portion that is opened in the first surface. The second reactant gas channel extends in the separator, and has, at an end thereof, an opening portion that is opened in the second surface. At least a portion of the opening portion of the first reactant gas channel and at least a portion of the opening portion of the second reactant gas channel are disposed, in the separator, along a first portion of a peripheral border of a power generation region that faces the power generation bodies when the separator is stacked with the power generation bodies.

According to the fuel cell in accordance with the first aspect, the opening portion of the channel extending in each separator so as to supply or discharge the first reactant gas and the opening portion of the channel extending in each separator so as to supply or discharge the second reactant gas are both disposed along the same portion of the power generation region. As a result, the first reactant gas and the second reactant gas can be caused to flow in parallel with each other in the power generation region. Therefore, the power generation performance of the fuel cell incorporating separators that have, therein, channels for supplying or discharging reactant gases can be improved.

In the fuel cell in accordance with the first aspect, the first reactant gas channel may be a first reactant gas discharge channel for discharging the first reactant gas from the first electrode, and the separator may further include a first reactant gas supply channel that is provided for supplying the first reactant gas to the first electrode facing the first surface and that extends in the separator and has, at an end of the first reactant gas supply channel, an opening portion that is opened in the first surface, and the opening portion of the first reactant gas discharge channel may be disposed along the first portion, and the opening portion of the first reactant gas supply channel may be disposed along a second portion of the peripheral border of the power generation region that is located opposite from the first portion across the power generation region. Therefore, the first reactant gas flows from the second portion toward the first portion of the peripheral border of the power generation region, and the second reactant gas flows from the first portion or toward the first portion. Hence, the first reactant gas and the second reactant gas can be caused to flow in parallel in the power generation region, and the power generation performance of the fuel cell can be improved.

In the fuel cell in accordance with the first aspect, the second reactant gas channel may be a second reactant gas supply channel for supplying the second reactant gas to the second electrode, and each separator may further include a second reactant gas discharge channel that is provided for discharging the second reactant gas from the second electrode facing the second surface and that extends in the separator and has, at an end of the second reactant gas discharge channel, an opening portion that is opened in the second surface, and the opening portion of the second reactant gas supply channel may be disposed along the first portion, and the opening portion of the second reactant gas discharge channel may be disposed along the second portion. Therefore, the first reactant gas flows from the second portion toward the first portion of the peripheral border of the power generation region, and the second reactant gas flows from the first portion toward the second portion. As a result, the first reactant gas and the second reactant gas can be caused to flow in parallel and in opposite directions in the power generation region. Therefore, the power generation performance of the fuel cell can be further improved.

In the fuel cell in accordance with the first aspect, a flowing direction in the first reactant gas channel may be substantially perpendicular to the first portion, and the flowing direction in the second reactant gas channel may be substantially parallel to the first portion. Therefore, the first reactant gas channel and the second reactant gas channel can be disposed in each separator without interference therebetween.

In the fuel cell in accordance with the first aspect, each separator may include a plurality of first reactant gas supply channels, and the first reactant gas supply channels may be disposed so that pressure losses of the first reactant gas supply channels become equal to each other. Therefore, the amounts of flow of gas in the first reactant gas supply channels can be uniformized. As a result, the supply of the first reactant gas can be uniformized, so that the power generation capability of the fuel cell can be improved.

In the fuel cell in accordance with the first aspect, each separator may further include a first reactant gas manifold that communicates with another end of the first reactant gas channel and that penetrates through the separator, and a second reactant gas manifold that communicates with another end of the second reactant gas channel and that penetrates through the separator, and the second reactant gas channel may have a channel width that becomes narrower with increasing distance from the second reactant gas manifold, and the channel width of the opening portion of the second reactant gas channel may also become narrower with increasing distance from the second reactant gas manifold, similarly to the channel width of the second reactant gas channel. Therefore, the pressure loss in the second reactant gas channel can be efficiently restrained.

The fuel cell in accordance with the first aspect may further include a porous body which is disposed between the second electrode of the another one of the power generation bodies and the second surface of the separator and in which the second reactant gas flows, and an external shape of the porous body may be formed so as to extend along the opening portion of the second reactant gas channel formed in the second surface. Therefore, the pressure loss that the second reactant gas undergoes while flowing from the second reactant gas manifold to the porous body can be further restrained.

In the fuel cell in accordance with the first aspect, an external shape of the power generation region may be a generally rectangular shape, and the first portion may be a portion that extends along substantially an entire length of the first side of the rectangular shape. Furthermore, the separator may further include a first reactant gas manifold that communicates with another end of the first reactant gas channel and that penetrates through the separator, and a second reactant gas manifold that communicates with the second reactant gas channel and that penetrates through the separator, and the first reactant gas manifold may be disposed outside the power generation region, along substantially the entire length of the first side of the power generation region, and the second reactant gas manifold may be disposed outside the power generation region, along a second side of the power generation region adjacent to the first side.

In the fuel cell in accordance with the first aspect, each separator may have a laminate structure that includes a first plate having the first surface, a second plate having the second surface, and an intermediate plate disposed between the first plate and the second plate, and the first reactant gas channel may be formed by a first intermediate plate penetration opening portion that penetrates through the intermediate plate and a first plate penetration opening portion that penetrates through the first plate, and the second reactant gas channel may be formed by a second intermediate plate penetration opening portion that penetrates through the intermediate plate and a second plate penetration opening portion that penetrates through the second plate. Therefore, the aforementioned separator can be realized with a simple construction in which three plates are stacked.

In the fuel cell in accordance with the first aspect, the first electrode may be a cathode, and the second electrode may be an anode, and the first reactant gas may be oxidizing gas, and the second reactant gas may be fuel gas.

A second aspect of the invention relates to separators that are stacked alternately with a plurality of power generation bodies each having a first electrode and a second electrode so as to construct a fuel cell. Each of the separator in accordance with the second aspect has: a first surface that faces the first electrode of one of the power generation bodies; a second surface that faces the second electrode of another one of the power generation bodies; a first reactant gas channel for supplying or discharging a first reactant gas to or from the first electrode facing the first surface; and a second reactant gas channel for supplying or discharging a second reactant gas to or from the second electrode facing the second surface. The first reactant gas channel extends in the separator, and has, at an end thereof, an opening portion that is opened in the first surface. The second reactant gas channel extends in the separator, and has, at an end thereof, an opening portion that is opened in the second surface. At least a portion of the opening portion of the first reactant gas channel and at least a portion of the opening portion of the second reactant gas channel are disposed, in the separator, along a first portion of a peripheral border of a power generation region that faces the power generation bodies when the separator is stacked with the power generation bodies.

If a fuel cell is constructed by using the separators in accordance with the second aspect, substantially the same operation and effects as those of the fuel cell in accordance with the first aspect can be achieved. Besides, the separators in accordance with the second aspect can also be realized in various manners, similarly to the fuel cell in accordance with the first aspect.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIGS. 9A and 9B are illustrative diagrams showing the flows of reactant gases of the fuel cell;

FIG. 13 is a diagram showing a shape of an anode plate in accordance with a second modification;

DETAILED DESCRIPTION OF EMBODIMENTS

Hereinafter, a fuel cell, an assembly that constitutes a fuel cell, and a seal-integrated member that constitutes a fuel cell will be described on the basis of embodiments with reference to the drawings.

Figure 1:
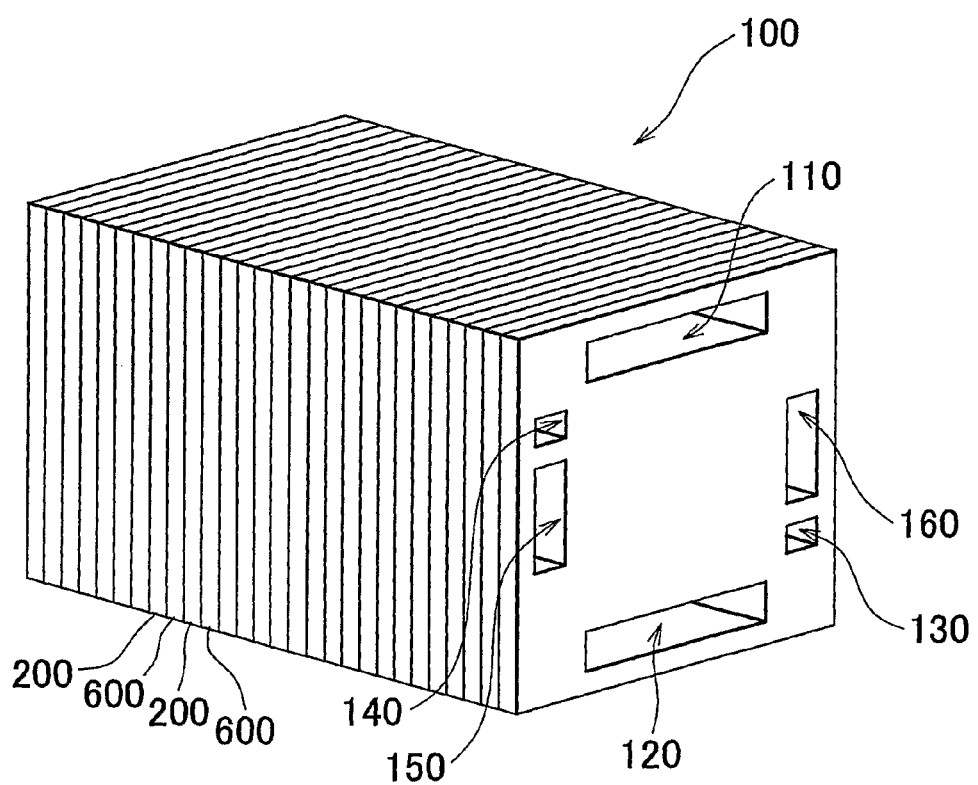
FIG. 1 is a first illustrative diagram showing a construction of a fuel cell in an embodiment of the invention.
Figure 2:
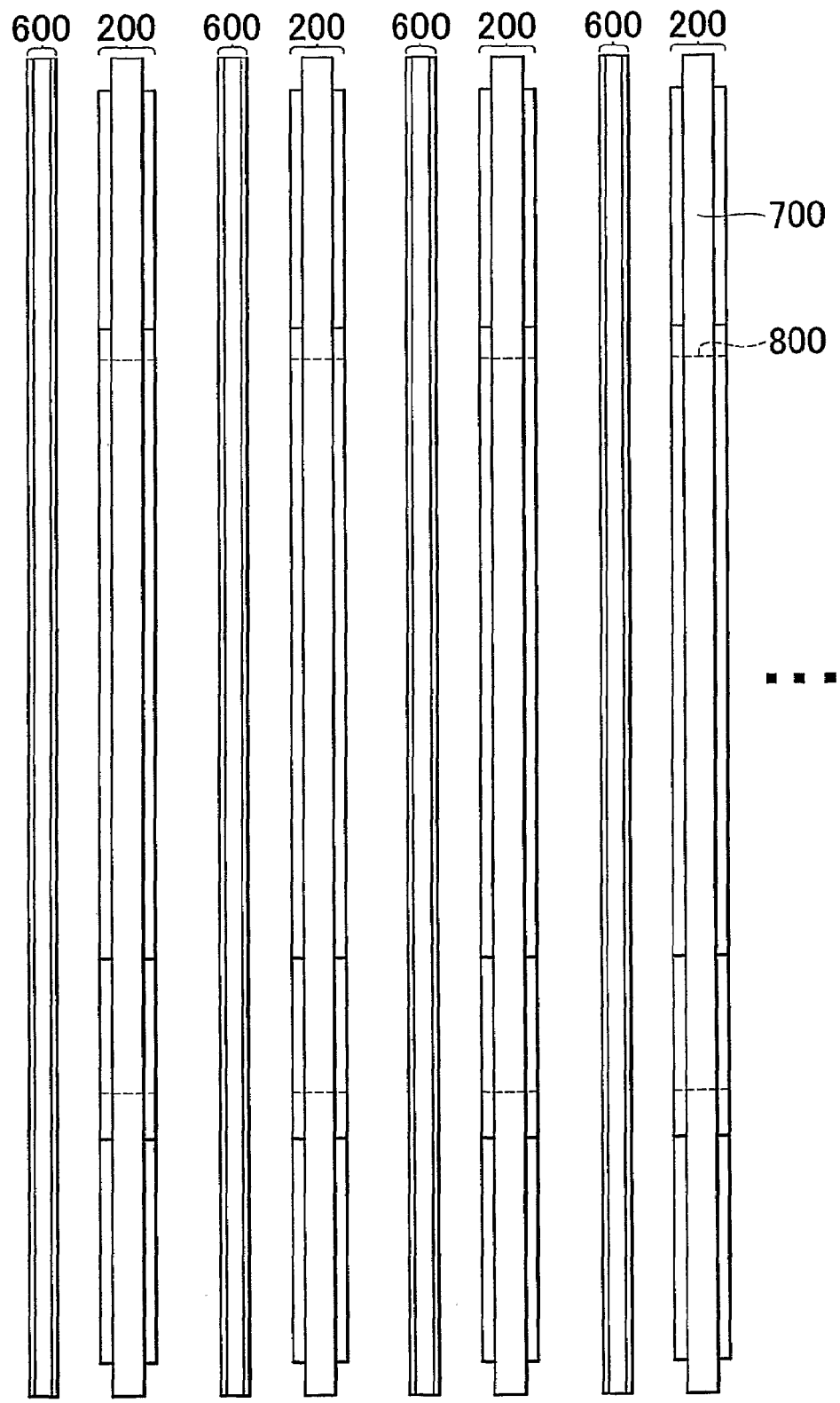
FIG. 2 is a second illustrative diagram showing a construction of the fuel cell in the embodiment.

An overall construction of a fuel cell in accordance with an embodiment of the invention will be described. FIGS. 1 and 2 are illustrative diagrams showing a construction of a fuel cell in accordance with an embodiment.

As shown in FIGS. 1 and 2, a fuel cell 100 has a stack structure in which a plurality of power generation modules 200 and a plurality of separators 600 are alternately stacked.

As shown in FIG. 1, the fuel cell 100 is provided with an oxidizing gas supply manifold 110 that is supplied with an oxidizing gas, an oxidizing gas discharge manifold 120 that discharges the oxidizing gas, a fuel gas supply manifold 130 that is supplied with a fuel gas, a fuel gas discharge manifold 140 that discharges the fuel gas, a cooling medium supply manifold 150 that supplies a cooling medium, and a cooling medium discharge manifold 160 that discharges the cooling medium. As the oxidizing gas, air is commonly used. As the fuel gas, hydrogen is commonly used. The oxidizing gas and the fuel gas are both called reactant gas as well. As the cooling medium, it is possible to use water, a antifreeze liquid, such as ethylene glycol or the like, air, etc.

Figure 3:
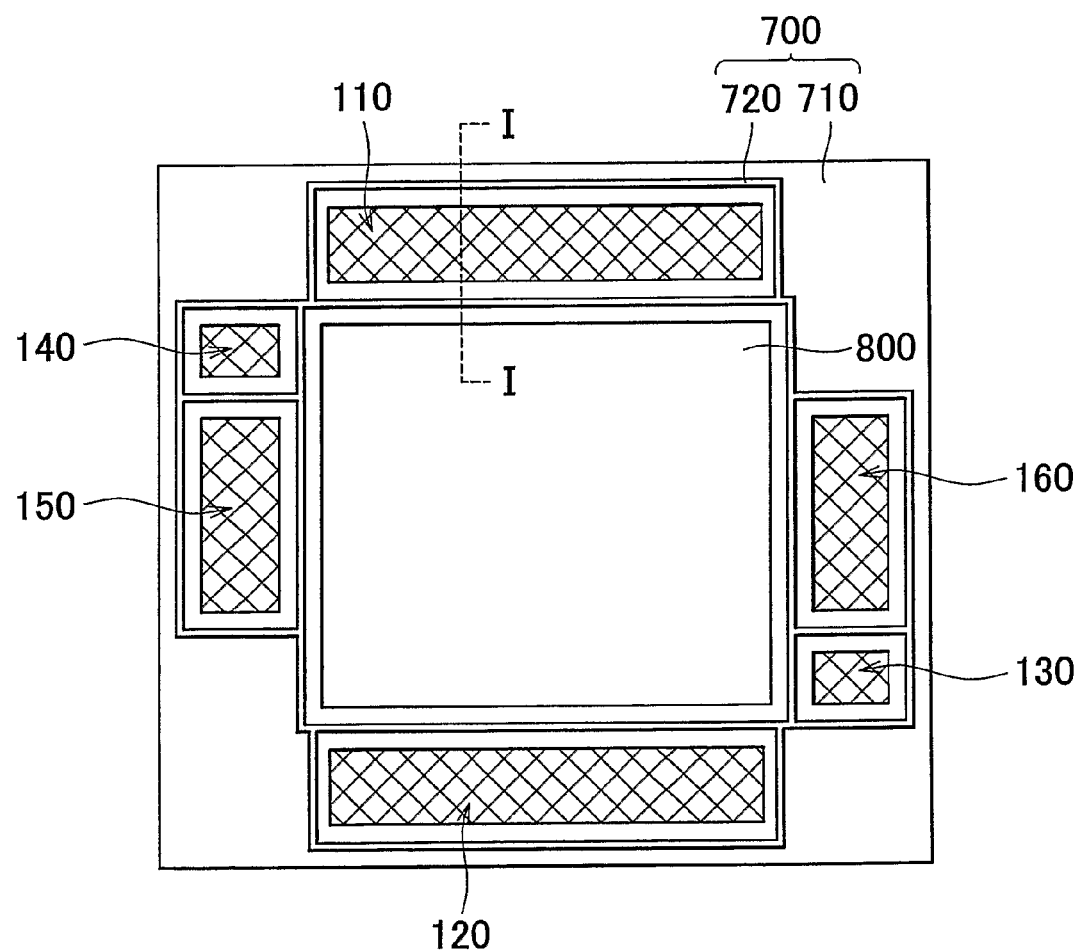
FIG. 3 is a diagram showing a front view of a power generation module (a view taken from the right side in FIG. 2)
Figure 4:
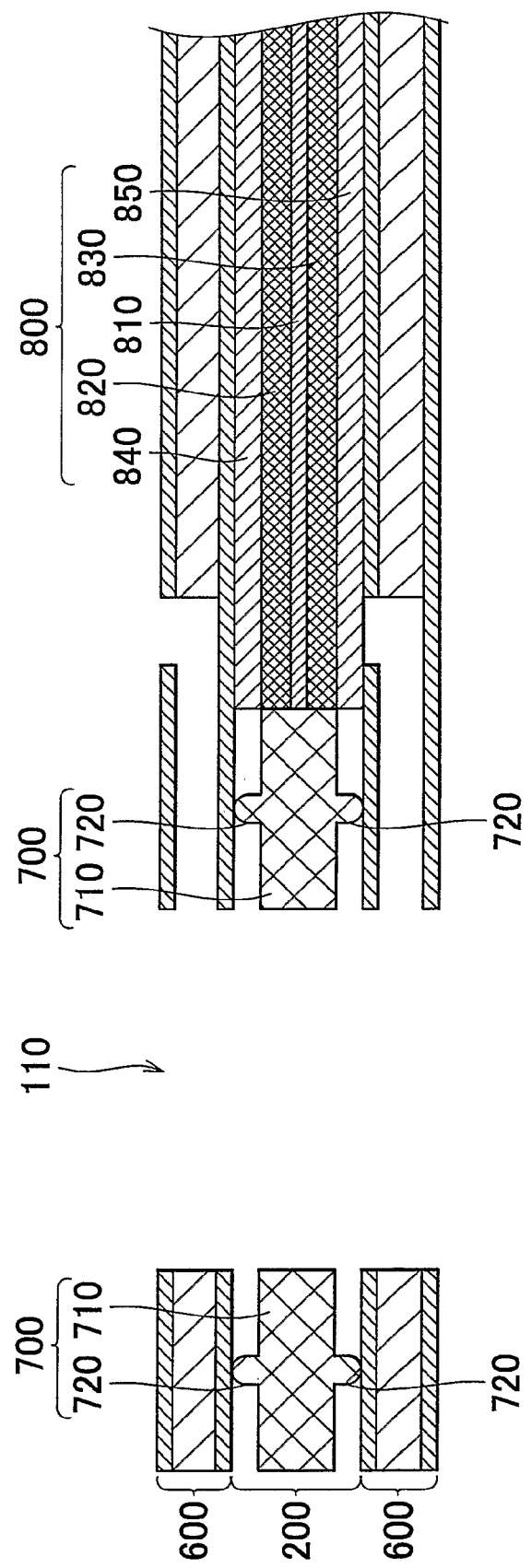
FIG. 4 is a sectional view showing a section taken along a plane I-I in FIG. 3.

With reference to FIGS. 3 and 4, the construction of a power generation module 200 will be described. FIG. 3 is a diagram showing a front view of the power generation module 200 (a view taken from the right side in FIG. 2). FIG. 4 is a sectional view taken on a plane I-I in FIG. 3. FIG. 4 shows, besides the power generation module 200, two separators 600 that sandwich the power generation module 200 when a fuel cell stack is constructed.

The power generation module 200 is constructed of a laminate member 800 and a seal member 700.

The laminate member 800, as shown in FIG. 4, is constructed by stacking a power generation body 810, an anode-side diffusion layer 820, a cathode-side diffusion layer 830, an anode-side porous body 840 and a cathode-side porous body 850. The members 820 to 850 constituting the laminate member 800 are platy members that have substantially the same shape as a power generation region DA described below, in a view in the stacking direction.

The power generation body 810, in this embodiment, is an ion exchange membrane that has, on a surface thereof, a catalyst layer applied as a cathode, and has, on the other surface, a catalyst layer applied as an anode (the catalyst layers are not shown). The ion exchange membrane is formed from an fluorine-based resin material or a hydrocarbon-based resin material, and has good ion conductivity in a moist state. The catalyst layers contain, for example, platinum, or an alloy made of platinum and another metal.

The anode-side diffusion layer 820 is disposed in contact with an anode-side surface of the power generation body 810, and the cathode-side diffusion layer 830 is disposed in contact with a cathode-side surface of the power generation body 810. The anode-side diffusion layer 820 and the cathode-side diffusion layer 830 are formed by, for example, a carbon cloth formed by weaving yarns of carbon fiber, a carbon paper, or a carbon felt.

The anode-side porous body 840 is disposed at the anode side of the power generation body 810 with the anode-side diffusion layer 820 sandwiched therebetween. The cathode-side porous body 850 is disposed at the cathode side of the power generation body 810 with the cathode-side diffusion layer 830 sandwiched therebetween. When a power generation module 200 and separators 600 are stacked to form a fuel cell 100, the cathode-side porous body 850 contacts the power generation region DA of the separator 600 disposed on the cathode side, and the anode-side porous body 840 contacts the power generation region DA of the other separator 600 disposed on the anode side. The anode-side porous body 840 and the cathode-side porous body 850 are formed from a porous material that has gas diffusivity and electroconductivity, such as a metal porous body. The anode-side porous body 840 and the cathode-side porous body 850 are higher in porosity than the anode-side diffusion layer 820 and the cathode-side diffusion layer 830, and are lower in the internal gas flow resistance than the anode-side diffusion layer 820 and the cathode-side diffusion layer 830. The anode-side porous body 840 and the cathode-side porous body 850 function as channels for the reactant gases to flow as described below.

The seal member 700 is disposed entirely around an outer periphery of the laminate member 800 in the planar directions thereof. The seal member 700 is made through the injection molding performed by injecting a molding material into a cavity of a mold to which an outer peripheral end portion of the laminate member 800 is exposed. Therefore, the seal member 700 is gaplessly and air-tightly integrated with the outer peripheral end of the laminate member 800. The seal member 700 is formed by a material that has gas impermeability, elasticity and heat resistance in the operation temperature range of the fuel cell, for example, a rubber or an elastomer. Concretely, silicone-based rubber, butyl rubber, acrylic rubber, natural rubber, fluorocarbon rubber, ethylene/propylene-based rubber, styrene-based elastomer, fluorocarbon elastomer, etc. can be used.

The seal member 700 has a support portion 710, and ribs 720 that are disposed on both sides of the support portion 710 and that form seal lines. As shown in FIGS. 3 and 4, the support portion 710 has penetration holes (manifold holes) that correspond to the manifolds 120 to 160 shown in FIG. 1. When the power generation module 200 and separators 600 are stacked, the ribs 720 closely attach to the adjacent separators 600 so as to seal the gaps with the separators 600, preventing leakage of the reactant gases (hydrogen and air in this embodiment) and the cooling water. The ribs 720 form a seal line that surrounds the entire periphery of the laminate member 800, and seal lines that surround the entire peripheries of the individual manifold holes.

Next, with reference to FIGS. 5 to 8, the construction of a separator 600 will be described. The separator 600 is constructed of an anode plate 300, a cathode plate 400 and an intermediate plate 500.

Figure 5:
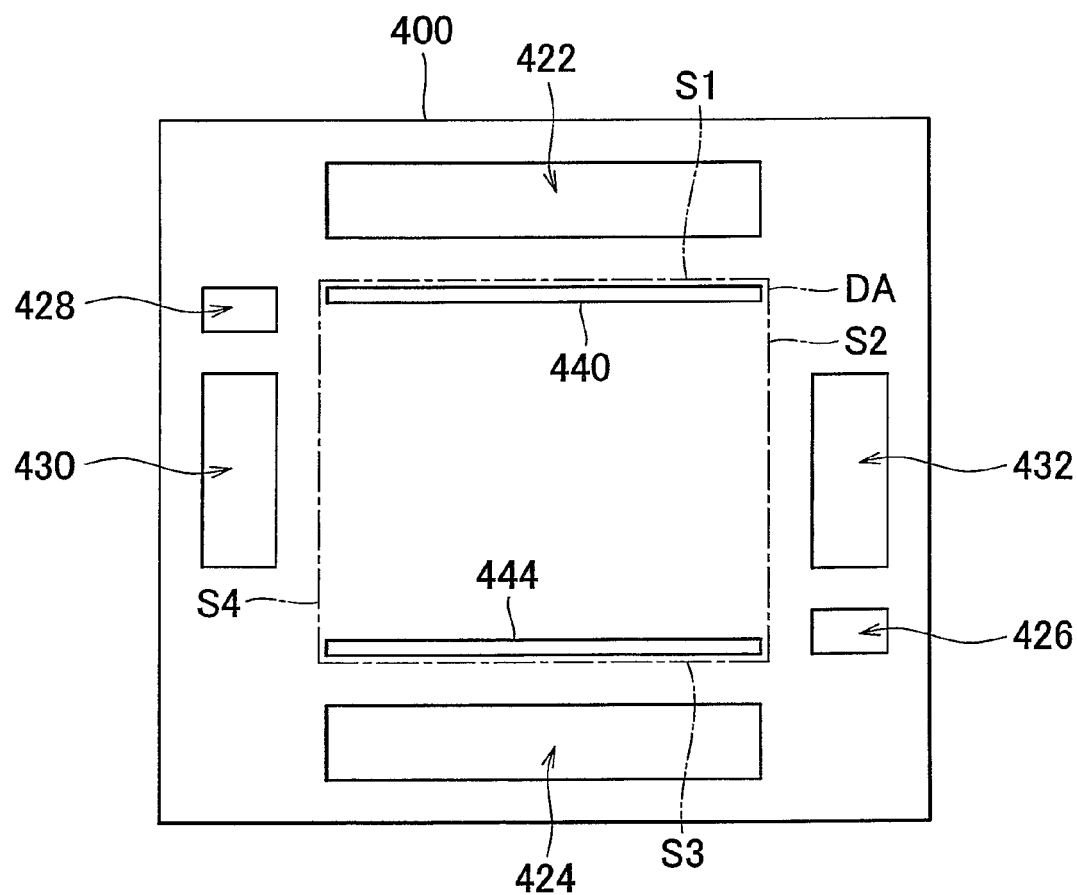
FIG. 5 is an illustrative diagram showing a shape of a cathode plate in the embodiment.
Figure 6:
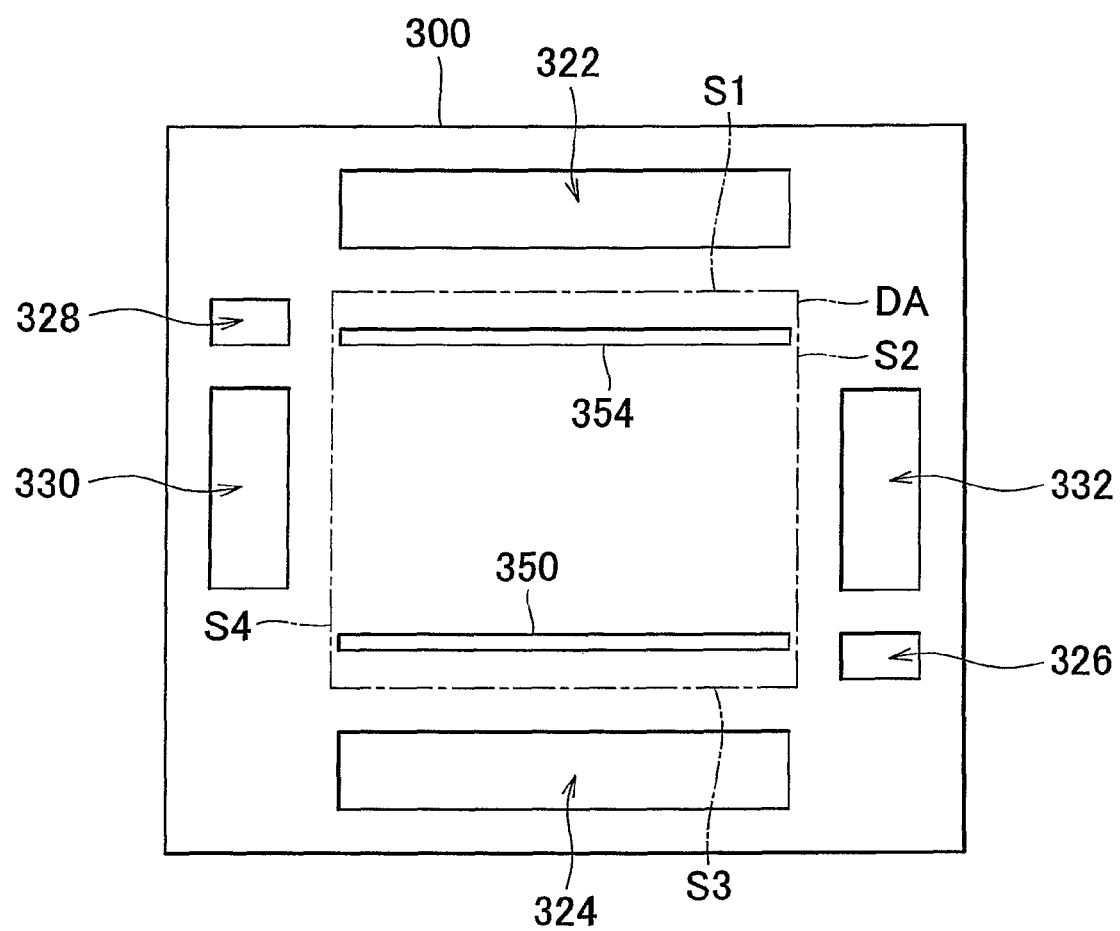
FIG. 6 is an illustrative diagram showing a shape of an anode plate in the embodiment.
Figure 7:
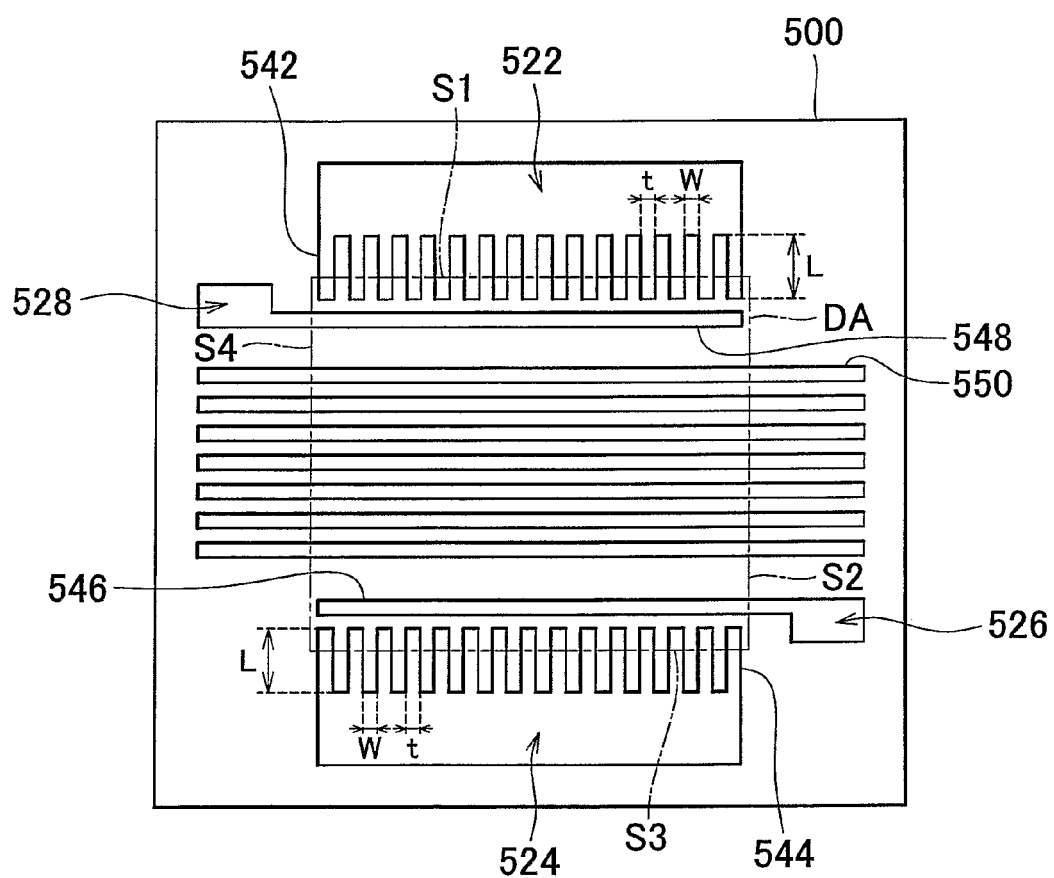
FIG. 7 is an illustrative diagram showing a shape of an intermediate plate in the embodiment.

FIGS. 5 to 7 are illustrative diagrams showing the shape of the cathode plate 400 (FIG. 5), the shape of the anode plate 300 (FIG. 6) and the shape of the intermediate plate 500 (FIG. 7), respectively, in the embodiment. FIGS. 5, 6 and 7 show the plates 400, 300 and 500 viewed from the right side in FIG. 2.

Figure 8:
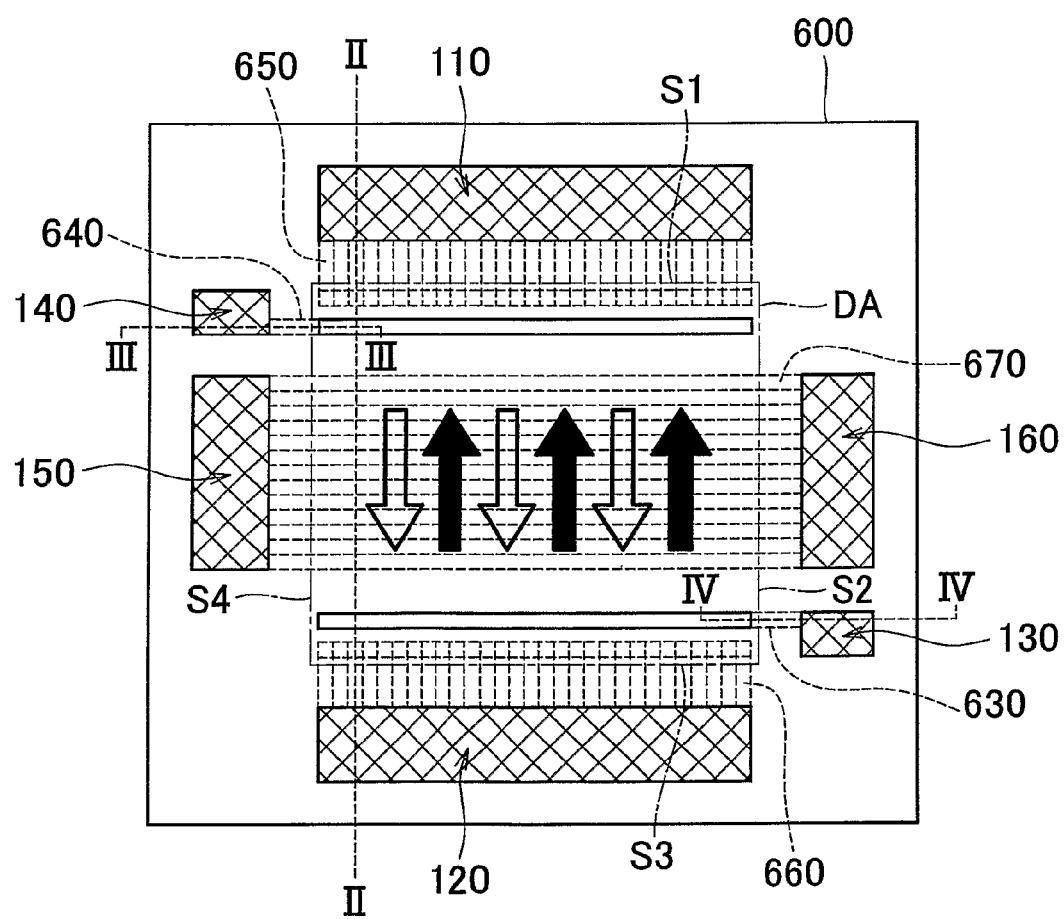
FIG. 8 is a front view of a separator in the embodiment.

FIG. 8 is a front view of the separator in the embodiment. In FIG. 5 to FIG. 8, a region DA in a central portion of each of the plates 300, 400, 500 and the separator 600 shown by a dashed line is a region that faces the power generation body 810 contained in the laminate member 800 of the power generation module 200 when the separator 600 is stacked with the power generation module 200, that is, a region in which electric power generation is actually performed (hereinafter, referred to as "power generation region DA"). Since the power generation body 810 is rectangular, the power generation region DA is naturally rectangular, too. In the following description, an upper side S1 of the power generation region DA in FIGS. 5 to 8 will be termed the first side. Likewise, a rightward side S2 of the power generation region DA will be termed the second side, and a lower side S3 will be termed the third side, and a leftward side S4 will be termed the fourth side. The first side S1 and the third side S3 are opposite to each other. Likewise, the second side S2 and the fourth side S4 are opposite to each other. The first side S1 and the second side S2 are adjacent to each other. Likewise, the second side S2 and the third side S3, and the third side S3 and the fourth side S4, and the fourth side S4 and the first side S1 are sides that are adjacent to each other.

The cathode plate 400 is formed, for example, of a stainless steel. The cathode plate 400 has, as penetration opening portions that penetrate through the cathode plate 400 in the thickness direction, six manifold-forming portions 422 to 432, an oxidizing gas supply slit 440, and an oxidizing gas discharge slit 444. The manifold-forming portions 422 to 432 are penetration opening portions for forming the foregoing various manifolds when the fuel cell 100 is constructed. The manifold-forming portions 422 to 432 are provided outside the power generation region DA. The oxidizing gas supply slit 440 is a generally rectangular elongated hole disposed inside the power generation region DA, along the first side S1. The oxidizing gas supply slit 440 is disposed along substantially the entire length of the first side S1. The oxidizing gas discharge slit 444, similarly to the oxidizing gas supply slit 440, is a generally rectangular elongated hole, and is disposed inside the power generation region DA, along the third side S3. The oxidizing gas discharge slit 444 is formed along substantially the entire length of the third side S3.

The anode plate 300, similarly to the cathode plate 400, is formed, for example, of a stainless steel. The anode plate 300, similarly to the cathode plate 400, has, as penetration opening portions that penetrate through the anode plate 300 in the thickness direction, six manifold-forming portions 322 to 332, a fuel gas supply slit 350, and a fuel gas discharge slit 354. The manifold-forming portions 322 to 332 are penetration opening portions for forming the foregoing various manifolds when the fuel cell 100 is constructed. As in the cathode plate 400, the manifold-forming portions 322 to 332 are provided outside the power generation region DA. The fuel gas supply slit 350 is disposed inside the power generation region DA along the third side S3 so as not to overlap with the oxidizing gas discharge slit 444 of the cathode plate 400 when the separator 600 is constructed. The fuel gas discharge slit 354 is disposed inside the power generation region DA along the first side S1 so as not to overlap with the oxidizing gas supply slit 440 of the cathode plate 400 when the separator 600 is constructed.

The intermediate plate 500, similar to the plates 300, 400, is formed, for example, of a stainless steel. The intermediate plate 500 has, as penetration opening portions that penetrate through the intermediate plate 500 in the thickness direction, four manifold-forming portions 522 to 528 for supplying/discharging a reactant gas (the oxidizing gas or the fuel gas), a plurality of oxidizing gas supply channel-forming portions 542, a plurality of oxidizing gas discharge channel-forming portions 544, a fuel gas supply channel-forming portion 546, and a fuel gas discharge channel-forming portion 548. The intermediate plate 500 further has a plurality of cooling medium channel-forming portions 550. The manifold-forming portions 522 to 528 are penetration opening portions for forming the foregoing various manifolds when the fuel cell 100 is constructed. As in the cathode plate 400 and the anode plate 300, the manifold-forming portions 522 to 528 are provided outside the power generation region DA.

Each of the cooling medium channel-forming portions 550 has an elongated hole shape that extends across the power generation region DA in the left-right direction in FIG. 8, and two ends thereof reach the outside of the power generation region DA. Specifically, each of the cooling medium channel-forming portions 550 is formed so as to cross the second side S2 and the fourth side S4 of the power generation region DA. The cooling medium channel-forming portions 550 are juxtaposed with predetermined intervals left therebetween in the up-down direction in FIG. 8.

An end of each of the oxidizing gas supply channel-forming portions 542 is linked in communication with the manifold-forming portion 522, that is, the oxidizing gas supply channel-forming portions 542 and the manifold-forming portion 522 form a comb-shape penetration hole as a whole. The opposite end of each of the oxidizing gas supply channel-forming portions 542 extends to such a position as to overlap with the oxidizing gas supply slit 440 of the cathode plate 400 when the three plates are joined to construct the separator 600. As a result, when the separator 600 is constructed, the oxidizing gas supply channel-forming portions 542 individually links in communication to the oxidizing gas supply slit 440. The oxidizing gas supply channel-forming portions 542, as shown in FIG. 7, have the same shape, that is, an elongated hole shape of the same length L and the same width W. The oxidizing gas supply channel-forming portions 542 are formed with equal intervals t left therebetween. The oxidizing gas supply channel-forming portions 542 are parallel to each other, and the length thereof extends substantially perpendicularly to the first side S1 of the power generation region DA.

An end of each of the oxidizing gas discharge channel-forming portions 544 is linked in communication to the manifold-forming portion 524, that is, the oxidizing gas discharge channel-forming portions 544 and the manifold-forming portion 524 form a comb-shape penetration hole as a whole. The opposite end of each of the oxidizing gas discharge channel-forming portions 544 extends to such a position as to overlap with the oxidizing gas discharge slit 444 of the cathode plate 400 when the three plates are joined to construct the separator 600. As a result, when the separator 600 is constructed, the oxidizing gas discharge channel-forming portions 544 individually link in communication to the oxidizing gas discharge slit 444. The oxidizing gas discharge channel-forming portions 544, as shown in FIG. 7, has the same shape, that is, an elongated hole shape of the same length L and the same width W. The oxidizing gas discharge channel-forming portions 544 are formed with equal intervals t left therebetween. The oxidizing gas discharge channel-forming portions 544 are parallel to each other, and the length thereof extends substantially perpendicularly to the third side S3 of the power generation region DA.

An end of the fuel gas supply channel-forming portion 546 is linked in communication to the manifold-forming portion 526. The fuel gas supply channel-forming portion 546 extends across the second side S2 and along the third side S3 at such a position as not to overlap with the oxidizing gas discharge channel-forming portions 544. The opposite end of the fuel gas supply channel-forming portion 546 reaches the vicinity of the fourth side S4 of the power generation region DA. That is, the fuel gas supply channel-forming portion 546 extends along substantially the entire length of the third side S3. Of the fuel gas supply channel-forming portion 546, a portion located inside the power generation region DA overlaps with the fuel gas supply slit 350 of the anode plate 300 when the three plates are joined to construct the separator 600. As a result, when the separator 600 is constructed, the fuel gas supply channel-forming portion 546 links in communication to the fuel gas supply slit 350.

An end of the fuel gas discharge channel-forming portion 548 is linked in communication to the manifold-forming portion 528. The fuel gas discharge channel-forming portion 548 extends across the fourth side S4 and along the first side S1 at such a position as not to overlap with the oxidizing gas supply channel-forming portions 542. The opposite end of the fuel gas discharge channel-forming portion 548 reaches the vicinity of the second side S2 of the power generation region DA. That is, the fuel gas discharge channel-forming portion 548 extends along substantially the entire length of the first side S1. Of the fuel gas discharge channel-forming portion 548, a portion located inside the power generation region DA overlaps with the fuel gas discharge slit 354 of the anode plate 300 when the three plates are joined to construct the separator 600. As a result, when the separator 600 is constructed, the fuel gas discharge channel-forming portion 548 links in communication to the fuel gas discharge slit 354.

FIG. 8 shows a front view of the separator 600 manufactured by using the plates 300, 400, 500. The separator 600 is manufactured by joining the anode plate 300 and the cathode plate 400 to the two opposite sides of the intermediate plate 500 so as to sandwich the intermediate plate 500, and blanking the exposed portions of the intermediate plate 500 that are located in regions that correspond to the cooling medium supply manifold 150 and the cooling medium discharge manifold 160. The method used to join the three plates may be, for example, theremocompression bonding, brazing, welding, etc. As a result, a separator 600 having six manifolds 110 to 160 that are penetration opening portions shown by hatching in FIG. 8, a plurality of oxidizing gas supply channels 650, a plurality of oxidizing gas discharge channels 660, a fuel gas supply channel 630, a fuel gas discharge channel 640, and a plurality of cooling medium channels 670 is obtained.

As shown in FIG. 8, in the separator 600, the oxidizing gas supply manifold 110 is formed outside the power generation region DA, along the first side S1, over the entire length of the first side S1. In the separator 600, the oxidizing gas discharge manifold 120 is formed outside the power generation region DA, along the third side S3, over the entirely length of the third side S3. In the separator 600, the fuel gas supply manifold 130 is formed along a lower end portion of the second side S2, and the cooling medium discharge manifold 160 is formed along the rest portion of the second side S2. Furthermore, in the separator 600, the fuel gas discharge manifold 140 is formed along an upper end portion of the fourth side S4, and the cooling medium supply manifold 150 is formed along the rest portion of the fourth side S4.

As shown in FIG. 8, each of the oxidizing gas supply channels 650 is formed by the oxidizing gas supply slit 440 of the cathode plate 400 and one of the oxidizing gas supply channel-forming portions 542 of the intermediate plate 500. Each of the oxidizing gas supply channels 650 is an internal channel that passes within the separator 600, and an end thereof is linked in communication to the oxidizing gas supply manifold 110, and another end thereof reaches the surface on the cathode plate 400 side (the cathode-side surface), and has an opening in the cathode-side surface. The opening portion of the other end of each of the oxidizing gas supply channels 650 corresponds to the oxidizing gas supply slit 440, as can be seen from FIG. 8. The oxidizing gas supply channels 650 have the same shape and the same size.

As shown in FIG. 8, each of the oxidizing gas discharge channels 660 is formed by the oxidizing gas discharge slit 444 of the cathode plate 400 and one of the oxidizing gas discharge channel-forming portions 544 of the intermediate plate 500. Each of the oxidizing gas discharge channels 660 is an internal channel that passes within the separator 600, and an end thereof is linked in communication to the oxidizing gas discharge manifold 120, and another end thereof reaches the cathode-side surface on the cathode plate 400 side, and has an opening in the cathode-side surface. The opening portion of the other end of each of the oxidizing gas discharge channels 660 corresponds to the oxidizing gas discharge slit 444, as can be seen from FIG. 8. The oxidizing gas discharge channels 660 have the same shape and the same size.

As shown in FIG. 8, the fuel gas discharge channel 640 is formed by the fuel gas discharge slit 354 of the anode plate 300 and the fuel gas discharge channel-forming portion 548 of the intermediate plate 500. The fuel gas discharge channel 640 is an internal channel that is linked at an end thereof in communication to the fuel gas discharge manifold 140, and that, at the other end thereof, has an opening in the surface of the anode plate 300 side (the anode-side surface). The opening portion of the other end of the fuel gas discharge channel 640 corresponds to the fuel gas discharge slit 354, as can be seen from FIG. 8.

As shown in FIG. 8, the fuel gas supply channel 630 is formed by the fuel gas supply slit 350 of the anode plate 300 and the fuel gas supply channel-forming portion 546 of the intermediate plate 500. The fuel gas supply channel 630 is an internal channel that is linked in communication, at an end thereof, to the fuel gas supply manifold 130, and that, at the other end thereof, has an opening in the anode-side surface. The opening portion of the other end of the fuel gas supply channel 630 corresponds to the fuel gas supply slit 350, as can be seen from FIG. 8.

As shown in FIG. 8, the cooling medium channels 670 are formed by the cooling medium channel-forming portions 550 (FIG. 7) formed in the intermediate plate 500, and are each linked in communication, at an end thereof, to the cooling medium supply manifold 150, and at the other end thereof, to the cooling medium discharge manifold 160.

As can be understood from the foregoing description, the plurality of oxidizing gas supply channels 650 and the plurality of oxidizing gas discharge channels 660 are disposed parallel to the flow direction in the power generation region DA (perpendicularly to the first side S1 and the third side S3) while the fuel gas discharge channel 640 and the fuel gas supply channel 630 are disposed perpendicularly to the flow direction in the power generation region DA (parallel to the first side S1 and the third side S3). This construction allows the channels 630, 640, 650, 660 in the separator so that the channels do not interfere with each other.

Operations of the fuel cell 100 in accordance with the embodiment will be described with reference to FIGS. 9A and 9B showing operation diagrams of the fuel cell. FIGS. 9A and 9B are illustrative diagrams showing the flows of the reactant gases of the fuel cell. For easier understanding, FIGS. 9A and 9B illustrate only a state in which two power generation modules 200 and two separators 600 are stacked.

FIG. 9A shows a sectional view that corresponds to a plane II-II in FIG. 8. In FIG. 9B, the right-side half shows a sectional view that corresponds to a plane IV-IV in FIG. 8, and the left-side half shows a sectional view that corresponds to a plane III-III in FIG. 8.

The fuel cell 100 generates electric power with the oxidizing gas supplied to the oxidizing gas supply manifold 110 and the fuel gas supplied to the fuel gas supply manifold 130. During the power generation of the fuel cell 100, a cooling medium is supplied to the cooling medium supply manifold 150 in order to restrain the temperature rise of the fuel cell 100 caused by the heat generation involved in the power generation.

The oxidizing gas supplied to the oxidizing gas supply manifold 110 passes, as shown by arrows in FIG. 9A, from the oxidizing gas supply manifold 110 via the oxidizing gas supply channels 650, and is supplied to the cathode porous bodies 850 via the opening portions of the oxidizing gas supply channels 650 in the cathode-side surfaces. The oxidizing gas supplied to the cathode porous bodies 850 flows from above to below as shown by hollow arrows in FIG. 8 within the cathode porous bodies 850 that function as channels of the oxidizing gas. Then, the oxidizing gas flows into the oxidizing gas discharge channels 660 via the opening portions of the oxidizing gas discharge channels 660 in the cathode-side surfaces, and is discharged into the oxidizing gas discharge manifold 120 via the oxidizing gas discharge channels 660. A portion of the oxidizing gas flowing in each cathode-side porous body 850 diffuses in the entire cathode-side diffusion layer 830 that is in contact with the cathode-side porous body 850, and is consumed in the cathode reaction (e.g., $2H^{+}+2e^{-}+(1/2)O_2 \rightarrow H_2O$).

The fuel gas supplied to the fuel gas supply manifold 130 passes, as shown in arrows in FIG. 9B, from the fuel gas supply manifold 130 via the fuel gas supply channels 630, and is supplied into the anode-side porous bodies 840 via the opening portions of the fuel gas supply channels 630 in the anode-side surfaces. The fuel gas supplied to the anode-side porous bodies 840 flows from below to above as shown in solid arrows in FIG. 8 within the anode-side porous bodies 840 that function as channels of the fuel gas. Then, the fuel gas flows into the fuel gas discharge channels 640 via the opening portions of the fuel gas discharge channels 640 in the anode-side surfaces, and is discharged into the fuel gas discharge manifold 140 via the fuel gas discharge channels 640. A portion of the fuel gas flowing in each anode-side porous body 840 diffuses in the entire anode-side diffusion layer 820 that is in contact with the anode-side porous body 840, and is consumed in the anode reaction (e.g., $H_2 \rightarrow 2H^{+}+2e^{-}$).

The cooling medium supplied to the cooling medium supply manifold 150 is supplied from the cooling medium supply manifold 150 into the cooling medium channels 670. The cooling medium supplied to each cooling medium channel 670 flows from one end to the other end of the cooling medium channel 670, and is discharged into the cooling medium discharge manifold 160.

According to the embodiment described above, the opening portions of the oxidizing gas supply channels 650 and the opening portion of the fuel gas discharge channel 640 are both arranged, as show in FIG. 8, along the first side S1 of the power generation region DA, over substantially the entire length of the first side S1. Besides, the opening portions of the oxidizing gas discharge channels 660 and the opening portion of the fuel gas supply channel 630 are both arranged along the third side S3 of the power generation region DA, specifically, over the entirely length of the third side S3. As a result, the direction in which the supplied oxidizing gas flows along the plane of the power generation body 810 (planar direction) (shown by the hollow arrows in FIG. 8) and the direction in which the supplied fuel gas flows along the plane of the power generation body 810 (planar direction) (shown by the solid arrows in FIG. 8) can be made parallel to each other. Furthermore, since the supply side of the fuel gas is the third side S3 side and the supply side of the oxidizing gas is the first side S1 side, the directions of flowage of the two reaction gases are made parallel to and opposite to each other (FIG. 8). This manner of flow of the reactant gases will be termed the counter flow in this description.

It has been recognized that the power generation performed with the counter flow improves the power generation performance of the fuel cell in comparison with the manner of flowage as in the related art in which the oxidizing gas and the fuel gas are caused to flow in orthogonal directions (cross flow).

Furthermore, the oxidizing gas supply channels 650 are the same in shape and size. Besides, the oxidizing gas discharge channels 660 are also the same in shape and size. Therefore, the pressure losses in the oxidizing gas supply channels 650 and the oxidizing gas discharge channels 660 can be uniformized. As a result, the amounts of flow of the oxidizing gas supplied to each cathode-side porous body 850 through the oxidizing gas supply channels 650 can be uniformized. Therefore, the supply of the oxidizing gas can be uniformized over the entire power generation region DA, so that the power generation performance can be improved.

Furthermore, in the embodiment, the oxidizing gas supply channels 650, extending in parallel with the flowing direction of the oxidizing gas in the power generation region DA (shown by the hollow arrows in FIG. 8), are arranged from one end to the other end of the first side S1 of the power generation region DA. Likewise, the oxidizing gas discharge channels 660, extending in parallel to the flowing direction of the oxidizing gas in the power generation region DA, are arranged from one end to the other end of the third side S3 of the power generation region DA. Therefore, the pressure loss involved in the supply of the oxidizing gas is made low, and the supply of the oxidizing gas to the power generation region DA is further uniformized.

On the other hand, in this embodiment, the number of the fuel gas supply channel 630 and the number of the fuel gas discharge channel 640 are one each. Due to the formation of one fuel gas supply channel 630 along the third side S3 and the formation of one fuel gas discharge channel 640 along the first side S1, the supply of the fuel gas to the entire power generation region DA is achieved. Hydrogen, which is the fuel gas, is greater in diffusion rate than oxygen in the air, which is the oxidizing gas. (It is to be noted herein that the diffusion rate depends mainly on the diffusion coefficient and the concentration gradation. The diffusion coefficient of hydrogen is about four times that of oxygen. Besides, the fuel gas used herein is pure hydrogen (about 100% in hydrogen concentration) while the oxidizing gas is air (about 20% in oxygen concentration). Therefore, it can be understood that the diffusion rate of oxygen in the oxidizing gas is considerably low as compared with the diffusion rat of hydrogen in the fuel gas.) Therefore, the provision of the one fuel gas supply channel 630 and the one fuel gas discharge channel 640 sufficiently allows the amount of hydrogen needed for the cell reactions. In other words, the rate of the electrochemical reactions of the fuel cell are generally determined by the reaction at the three-phase interface of the cathode ($2H^{+}+2e^{-}+(1/2)O_2 \rightarrow H_2O$). Therefore, the adoption of a channel construction that stresses the oxidizing gas supply characteristic leads to further improvement in the cell performance.

Furthermore, the oxidizing gas supply channels 650 are substantially perpendicular to the first side S1 of the power generation region DA. As a result, the oxidizing gas supply channels 650 extend substantially perpendicularly to the direction of the seal line (FIG. 3) surrounding the power generation region DA, across under the seal line, like a tunnel. As a result, while the line length of the seal line located over the oxidizing gas supply channels 650 is minimized, a channel width of each oxidizing gas supply channel 650 can be secured. Likewise, the oxidizing gas discharge channels 660 are substantially perpendicular to the third side S3, and extend substantially perpendicularly to the direction of the seal line, across under the seal line, like a tunnel. Similarly, the fuel gas supply channel 630 is substantially perpendicular to the second side S2, and the fuel gas discharge channel 640 is substantially perpendicular to the fourth side S4. Thus, the fuel gas supply channel 630 and the fuel gas discharge channel 640 extend substantially perpendicularly in direction to the seal line, across under the seal line, like tunnels. As a result, in the seal line, the length of a line under which a space is located is minimized, so that the deterioration of the seal property can be restrained.

Figure 10:
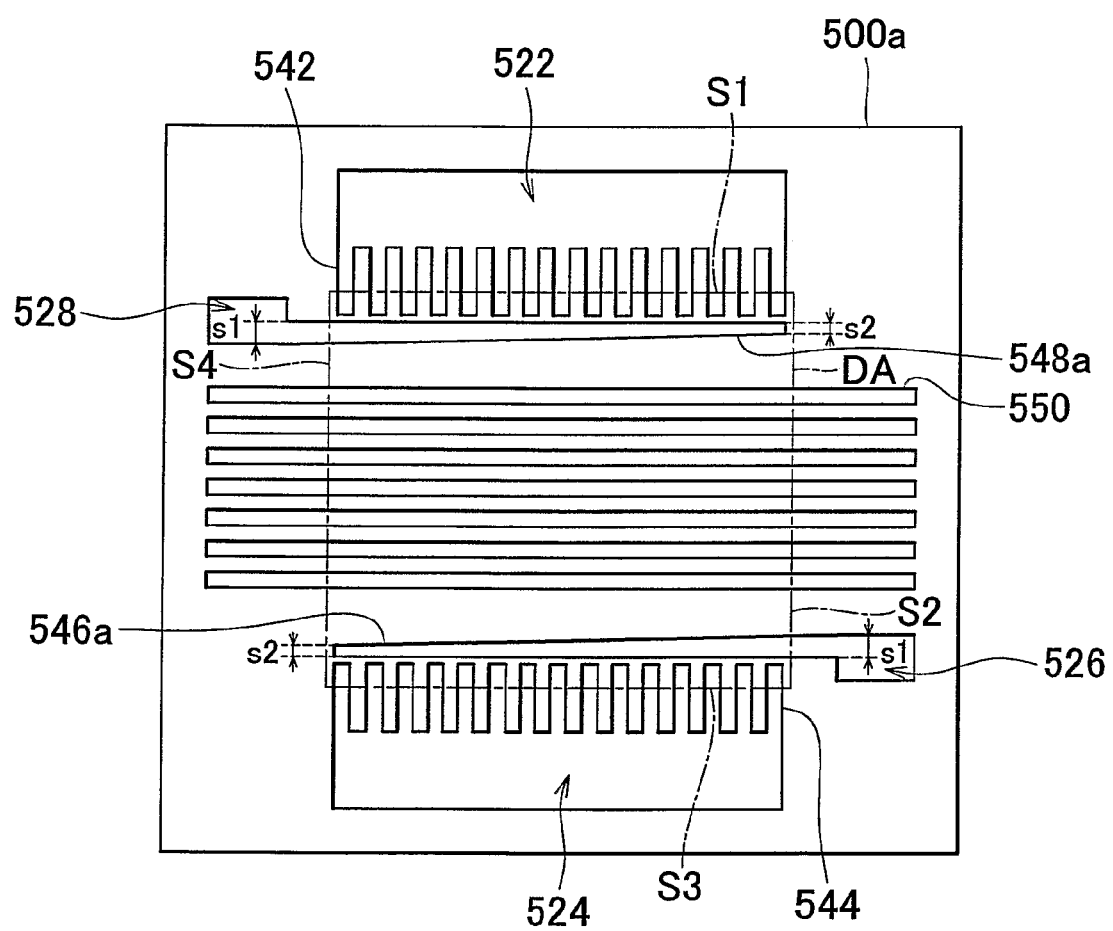
FIG. 10 is a diagram showing a shape of an intermediate plate in a first modification.
Figure 11:
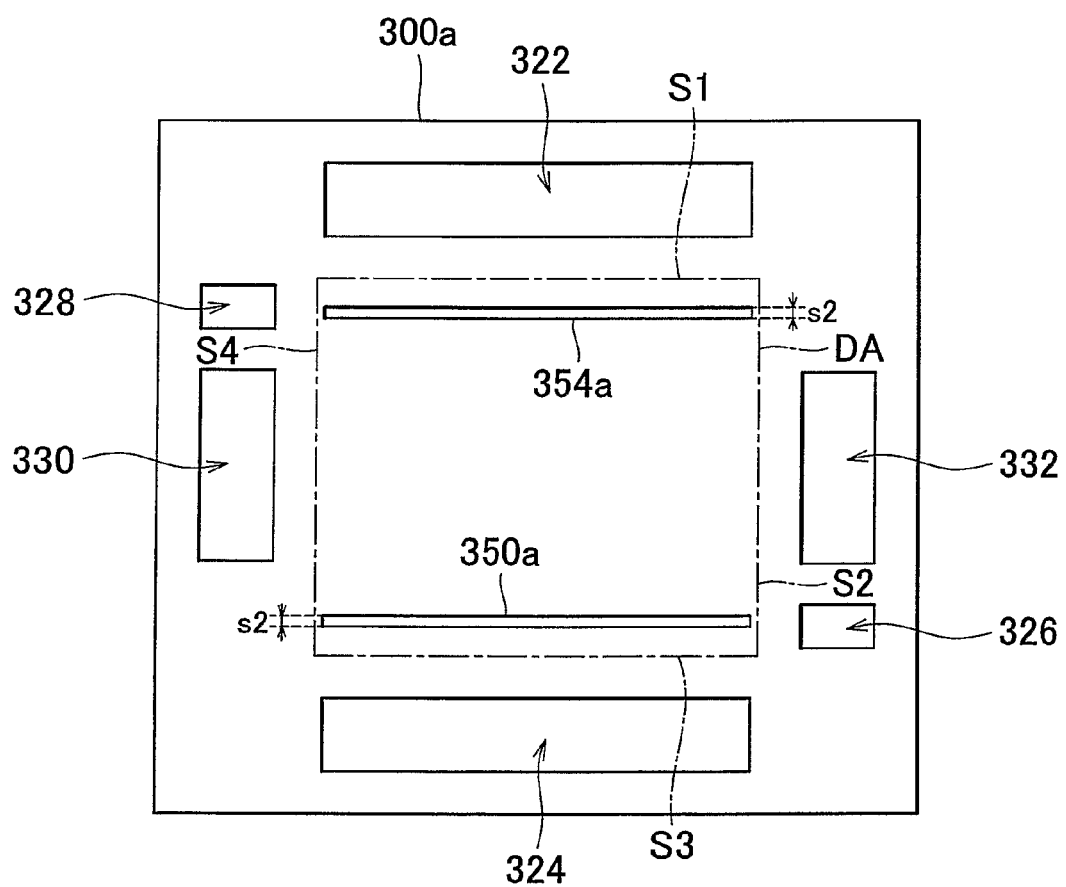
FIG. 11 is a diagram showing a shape of an anode plate in the first modification.
Figure 12:
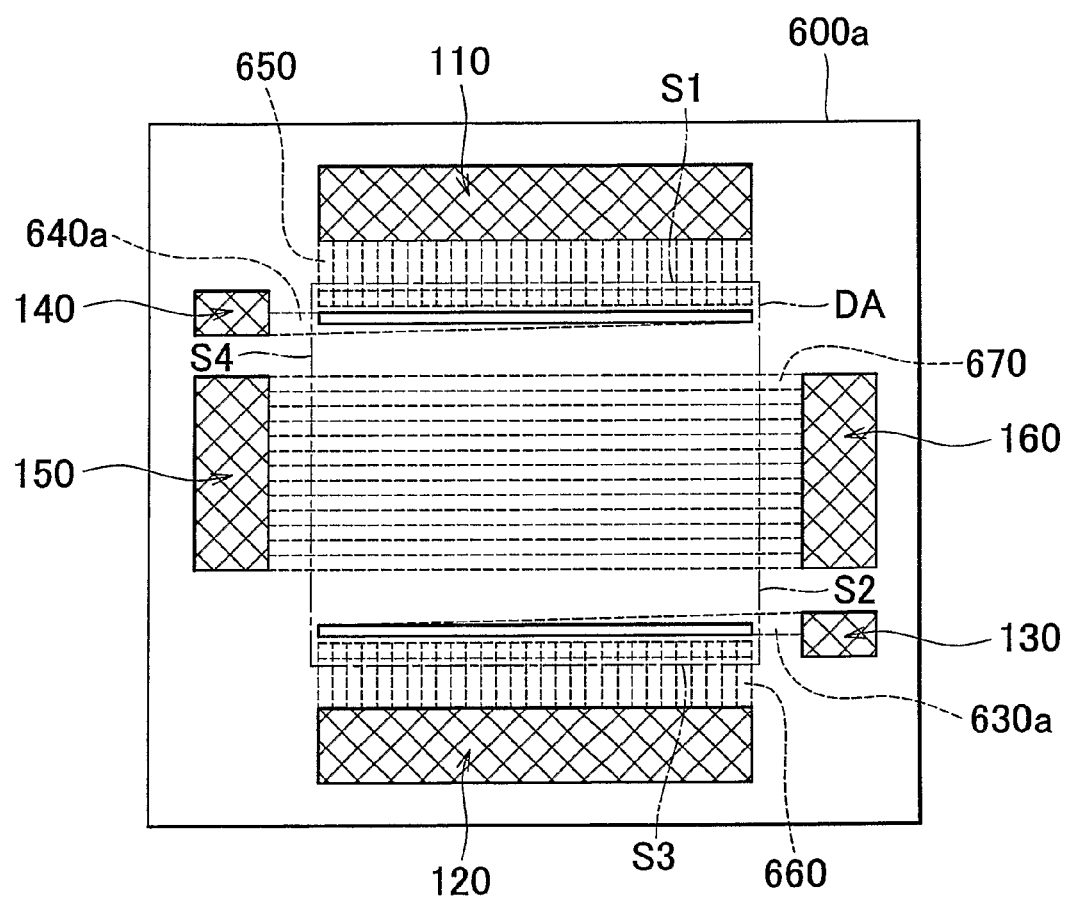
FIG. 12 is a front view of a separator in the first modification.

With reference to FIGS. 10 to 12, a first modification will be described. FIG. 10 is a diagram showing a shape of an intermediate plate 500a in the first modification. FIG. 11 is a diagram showing a shape of an anode plate 300a in the first modification. FIG. 12 is a front view of a separator 600a in accordance with the first modification.

A separator 600a (FIG. 12) in the first modification is different from the separator 600 (FIG. 8) in the foregoing embodiment in the construction of an intermediate plate 500a (FIG. 10) and the construction of an anode plate 300a (FIG. 11). The construction of the cathode plate of the separator 600a in the first modification is the same as that of the cathode plate 400 (FIG. 5), so that the same reference characters are used, and the description thereof is omitted.

The construction of the intermediate plate 500a in the first modification is different from the construction of the intermediate plate 500 (FIG. 7) in the foregoing embodiment, in respect of the construction of a fuel gas supply channel-forming portion 546a and a fuel gas discharge channel-forming portion 548a. The fuel gas supply channel-forming portion 546a of the intermediate plate 500a in the first modification does not have a uniform channel width, unlike the fuel gas supply channel-forming portion 546 of the intermediate plate 500 in the embodiment. In the first modification, of the two longitudinal sides of the fuel gas supply channel-forming portion 546a, a side near the third side S3 of the power generation region DA is parallel to the third side S3 while the side remote from the third side S3 is not parallel to the third side S3 but is inclined with respect to the third side S3. As a result, with regard to the fuel gas supply channel-forming portion 546a of the intermediate plate 500a in the first modification, a width s1 of an end portion at a side where the fuel gas supply channel-forming portion 546a communicates with the manifold-forming portion 526 is greater than a width s2 of an end portion at the opposite side (FIG. 10). Likewise, the fuel gas discharge channel-forming portion 548a of the intermediate plate 500a in the first modification does not have a uniform channel width, unlike the fuel gas discharge channel-forming portion 548 of the intermediate plate 500 in the foregoing embodiment. In the first modification, of the two longitudinal sides of the fuel gas discharge channel-forming portion 548a, a side near the first side S1 of the power generation region DA is parallel to the first side S1 while the side remote from the first side S1 is not parallel to the first side S1 but is inclined with respect to the first side S1. As a result, with regard to the fuel gas discharge channel-forming portion 548a of the intermediate plate 500a in the first modification, a width s1 of an end portion at a side where the fuel gas discharge channel-forming portion 548a communicates with the manifold-forming portion 528 is greater than a width s2 of an end portion at the opposite side (FIG. 10). The other constructions of the intermediate plate 500a in the first modification are the same as those of the intermediate plate 500 in the foregoing embodiment. Therefore, the same constructions shown in FIG. 10 are assigned with the same reference characters as used in FIG. 7, and the descriptions thereof is omitted.

The construction of the anode plate 300a in the first modification is different from the construction of the anode plate 300 (FIG. 6) in the foregoing embodiment, in the constructions of a fuel gas supply slit 350a and a fuel gas discharge slit 354a. As for the fuel gas supply slit 350a of the anode plate 300a in the first modification, the width of the slit is made equal to the width s2 of the end portion of the fuel gas supply channel-forming portion 546a that is opposite from the manifold-forming portion 526 (FIG. 11). The fuel gas discharge slit 354a is formed in the same manner. The other constructions of the anode plate 300a in the first modification are the same as those of the anode plate 300 in the foregoing embodiment. Therefore, the same constructions shown in FIG. 11 are assigned with the same reference characters as used in FIG. 6, and the descriptions thereof will be omitted.

The separator 600a in the modification constructed of the anode plate 300a (FIG. 11), the intermediate plate 500a (FIG. 10), and the cathode plate 400 (FIG. 5) that is the same as in the foregoing embodiment has a fuel gas supply channel 630a whose channel width becomes broader toward a side near the fuel gas supply manifold 130 (upstream side) and becomes narrower toward the side remote therefrom (downstream side). This construction will restrain the pressure loss of the fuel gas occurring at the time of the flow through the fuel gas supply channel 630a. A reason for this will be explained in some more details. The fuel gas that flows from the fuel gas supply manifold 130 into the fuel gas supply channel 630a is supplied into the anode-side porous body 840 via various portions of the elongated opening portion of the fuel gas supply channel 630a (i.e., the fuel gas supply slit 350a). Therefore, in the fuel gas supply channel 630a, the amount of flow of the fuel gas becomes greater toward the upstream side, and becomes lower toward the downstream side. Hence, in the case where the fuel gas supply channel has a uniform channel width as in the foregoing embodiment, the pressure loss in the fuel gas supply channel becomes greater toward the upstream side, and becomes smaller to the downstream side. Therefore, if the channel width of the fuel gas supply channel 630a is made broader toward the upstream side and narrower toward the downstream side as in this modification, the pressure loss of the fuel gas supply channel 630a can be restrained while the channel area thereof is restrained. It is preferable that the channel area of the fuel gas supply channel 630a be as small as possible, from the viewpoints of efficient utilization of the space of the separators. By making smaller the pressure loss in the fuel gas supply channel 630a, it becomes possible to restrain the difference between the amount of flow of the fuel gas supplied to the anode-side porous body 840 from a portion of the elongated opening portion (fuel gas supply slit 350a) that is near the fuel gas supply manifold 130 and the amount of flow of the fuel gas supplied to the anode-side porous body 840 from a portion of the elongated opening portion that is remote from the fuel gas supply manifold 130. As a result, the supply of the fuel gas to the power generation region DA is further uniformized. As a result, the power generation performance of the fuel cell can be improved.

Furthermore, the separator 600a in this modification has a fuel gas discharge channel 640a whose channel width becomes broader toward the side close to the fuel gas discharge manifold 140 (the downstream side) and becomes narrower toward the side remote from the fuel gas discharge manifold 140 (the upstream side). This construction will restrain the pressure loss of the fuel gas during the passage through the fuel gas discharge channel 640a. A reason for this will be explained. The fuel gas flows from various portions of the elongated opening portion (the fuel gas discharge slit 354a) of the fuel gas discharge channel 640a into the fuel gas discharge channel 640a. Therefore, in the fuel gas discharge channel 640a, the amount of flow of the fuel gas becomes smaller toward the upstream side, and becomes larger toward the downstream side. Then, in the case where the channel width of the fuel gas discharge channel is uniform as in the foregoing embodiment, the pressure loss in the fuel gas discharge channel becomes smaller toward the upstream side and becomes greater toward the downstream side. Therefore, if the channel width of the fuel gas discharge channel 640a is made narrower toward the upstream side and broader toward the downstream side as in this modification, the pressure loss can be restrained while the channel area of the fuel gas discharge channel 640a is restrained. As a result, the supply of the fuel gas to the power generation region DA is further uniformized. As a result, the power generation performance of the fuel cell can be improved.

Figure 14:
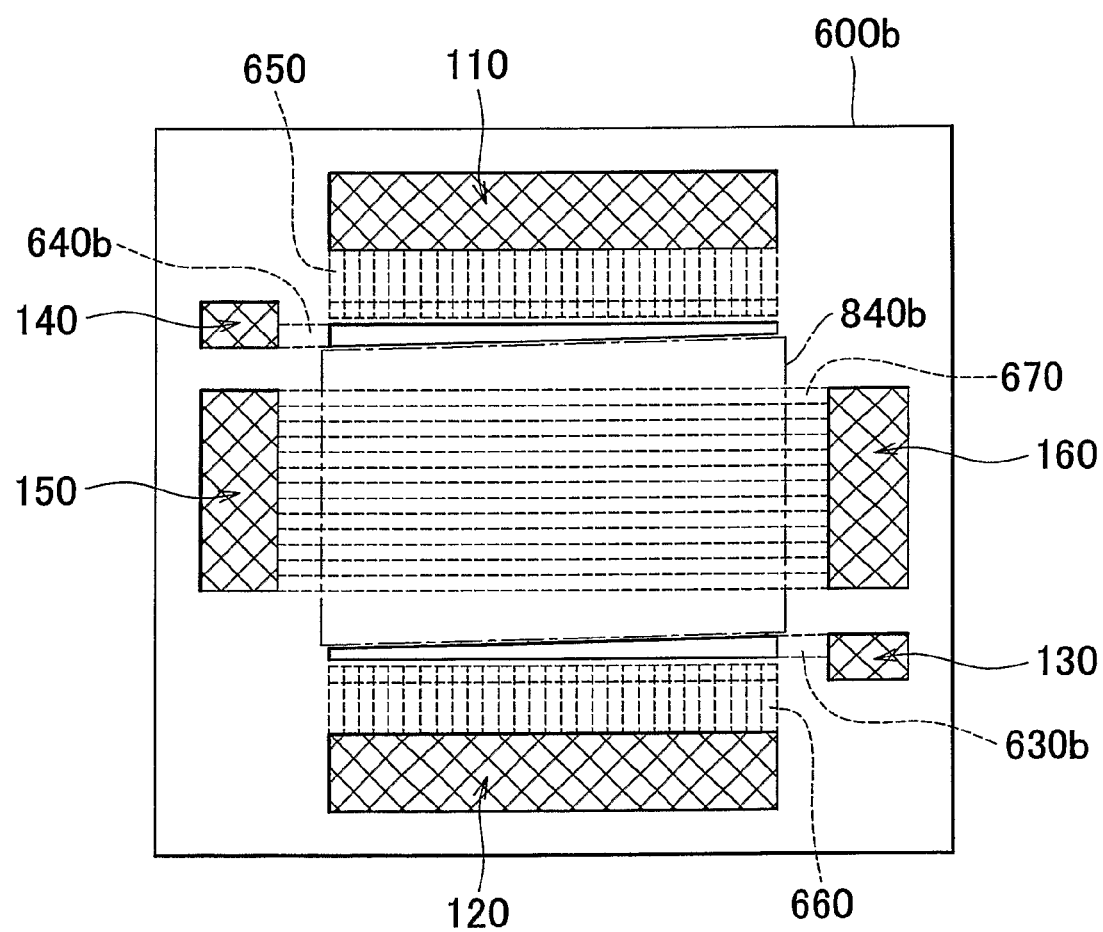
FIG. 14 is a front view of the separator in the second modification.

With reference to FIGS. 13 and 14, a second modification will be described. FIG. 13 is a diagram showing the shape of an anode plate 300b in the second modification. FIG. 14 is a front view of a separator 600b in the second modification.

The separator 600b (FIG. 14) of the second modification is different from the separator 600a (FIG. 12) of the first modification, in the construction of the anode plate 300b (FIG. 13). Besides, the shape of the anode-side porous body 840b used in the second modification is different from the shape of the anode-side porous body 840 used in the foregoing embodiment. The constructions of an intermediate plate and a cathode plate of the separator 600b in the second modification are the same as the corresponding constructions in the first modification, and the descriptions thereof will be omitted.

The construction of the anode plate 300b of the second modification is different from the construction of the anode plate 300 (FIG. 6) of the foregoing embodiment in the constructions of a fuel gas supply slit 350b and a fuel gas discharge slit 354b. As for the width of the fuel gas supply slit 350b of the anode plate 300b in the second modification, the width thereof at a side near the fuel gas supply manifold-forming portion 326 is broader, and the width thereof at a side remote therefrom is narrower. Similarly, as for the width of the fuel gas discharge slit 354b of the anode plate 300b in the second modification, the width thereof at a side near the fuel gas discharge manifold-forming portion 328 is broader, and the width thereof at a side remote therefrom is narrow. As a result, when the separator 600b is constructed, the fuel gas supply slit 350b of the anode plate 300b becomes superposed exactly on the fuel gas supply channel-forming portion 546a of the intermediate plate 500a, within the power generation region DA (FIG. 14). Likewise, the fuel gas discharge slit 354b of the anode plate 300b becomes superposed exactly on the fuel gas discharge channel-forming portion 548a of the intermediate plate 500a, within the power generation region DA (FIG. 14).

FIG. 14 shows, by a one-dot dashed line, a shape of the anode-side porous body 840b that is used in the second modification to construct a fuel cell through the use of separators 600b. The shape of the anode-side porous body 840b used in this modification is set so as not to overlap with either an opening portion (the fuel gas discharge slit 354b) of the fuel gas discharge channel 640b that is open in the anode-side surface of the separator 600b or an opening portion (the fuel gas supply slit 350b) of the fuel gas supply channel 630b. Concretely, as shown in FIG. 14, the shape of the anode-side porous body 840b is caused to be a parallelogram along a side of each of the two opening portions (the fuel gas discharge slit 354b and the fuel gas supply slit 350b) that is closer to a center portion of the power generation region DA.

According to this modification, the fuel gas supply channel 630b has an opening whose width becomes broader with decreasing distance to the fuel gas supply manifold 130, and becomes narrower with increasing distance therefrom. Furthermore, the anode-side porous body 840b has such a shape as not to overlap with the opening portions in the stacking direction. Therefore, a space that is larger than in the foregoing embodiment and the first modification is formed in an extent between the fuel gas supply manifold 130 and the end portion of the anode-side porous body 840 through which the fuel gas is supplied. As a result, the pressure loss occurring during the flowage of the fuel gas from the fuel gas supply manifold 130 to the end portion of the anode-side porous body 840 can be further reduced. As a result, the supply of the fuel gas to the power generation region DA can be further uniformized, and the power generation performance of the fuel cell can be improved.

Likewise, in this modification, a space that is larger than in the foregoing embodiment and the first modification is formed in an extent between the other-side end portion of the anode-side porous body 840 to the fuel gas discharge manifold 140 through which the fuel gas is discharged. As a result, the pressure loss occurring during the flowage of the fuel gas from the end portion of the anode-side porous body 840 to the fuel gas discharge manifold 140 can be further reduced. As a result, the supply of the fuel gas to the power generation region DA can be further uniformized, and the power generation performance of the fuel cell can be improved.

Figure 15:
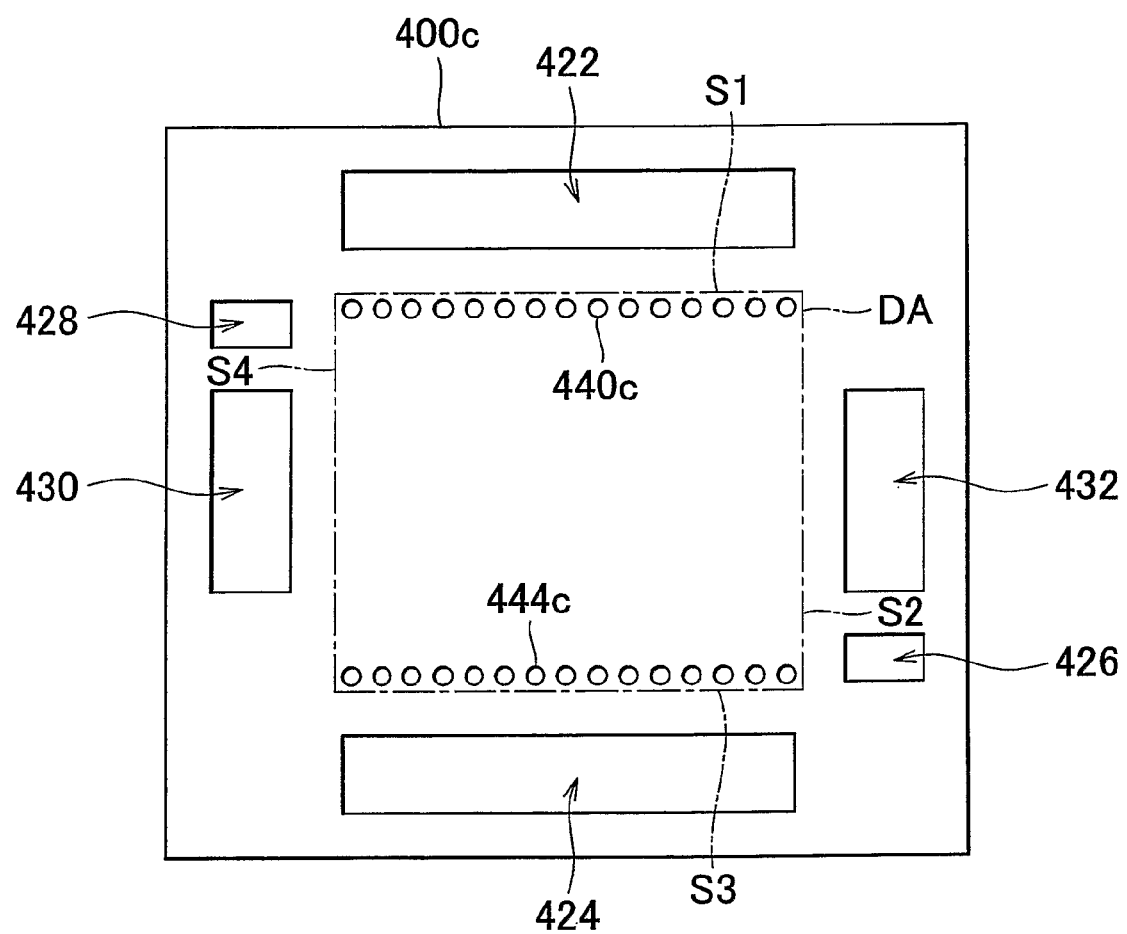
FIG. 15 is a diagram showing a shape of a cathode plate in a third modification.
Figure 16:
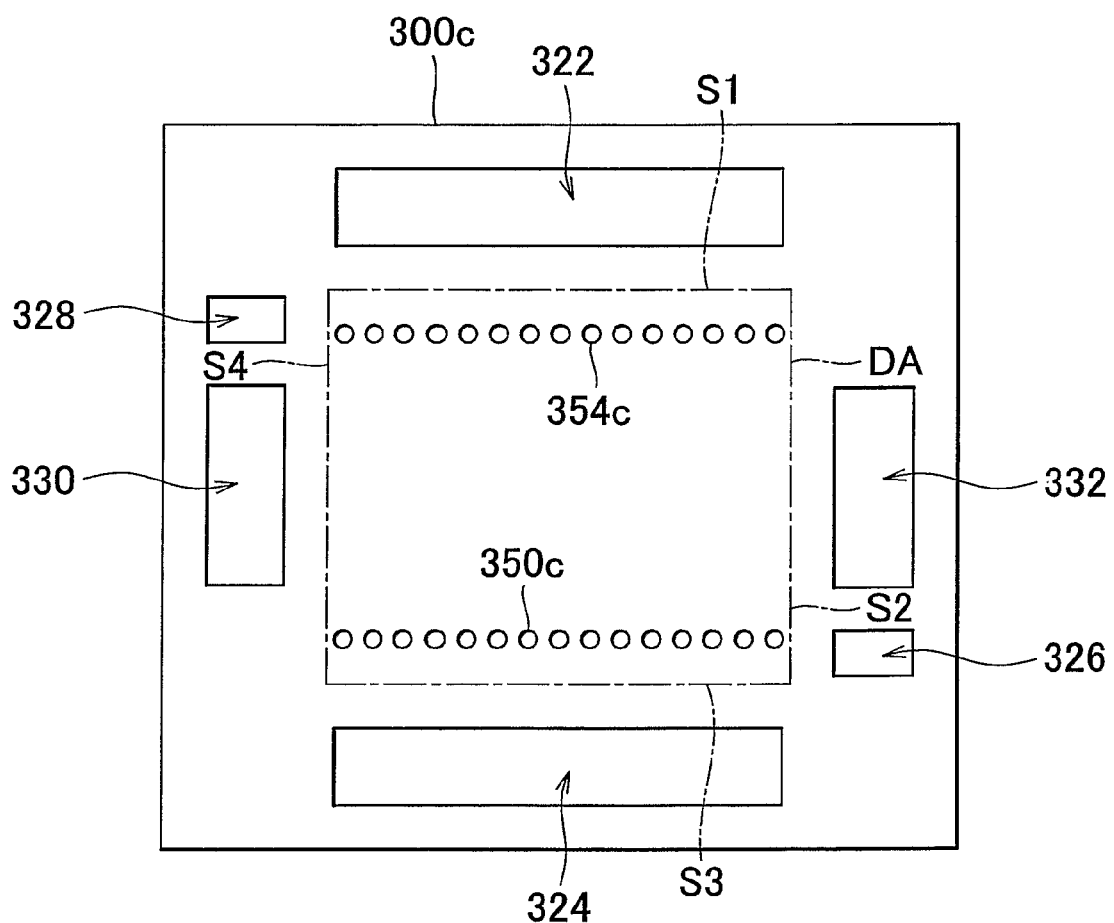
FIG. 16 is a diagram showing the shape of an anode plate in the third modification.

Although in the foregoing embodiment, the opening portions of the internal channels that are opened in the surface of the separator 600 are generally elongated hole-shape slits, this is not restrictive. FIG. 15 is a diagram showing a shape of a cathode plate 400c in a third modification. FIG. 16 is a diagram showing a shape of an anode plate 300c in the third modification. As shown in FIG. 15, the cathode plate 400c in the third modification is provided with a plurality of oxidizing gas supply holes 440c in place of the oxidizing gas supply slit 440 of the cathode plate 400 in the foregoing embodiment. The oxidizing gas supply holes 440c are equidistantly disposed along the first side S1, specifically, aligned along the entire length of the first side S1. Besides, the cathode plate 400c in the third modification is provided with a plurality of oxidizing gas discharge holes 444c in place of the oxidizing gas discharge slit 444 of the cathode plate 400 in the embodiment. The oxidizing gas discharge holes 444c are equidistantly disposed along the third side S3, specifically, aligned along the entire length of the third side S3. Likewise, as shown in FIG. 16, the anode plate 300c in the third modification is provided with a plurality of fuel gas discharge holes 354c in place of the fuel gas discharge slit 354 of the anode plate 300 in the embodiment, and is also provided with a plurality of fuel gas supply holes 350c in place of the fuel gas supply slit 350 of the anode plate 300 in the embodiment. The fuel gas discharge holes 354c and the fuel gas supply holes 350c are disposed equidistantly and aligned along the entire length of the first side S1 and the entire length of the third side S3, respectively, at such positions as not to overlap with the oxidizing gas discharge holes 444c and the oxidizing gas supply holes 440c, respectively, of the cathode plate in the stacking direction. The other constructions of the separator in this modification are the same as those of the separator 600 in the embodiment, and the descriptions thereof will be omitted. This modification also attain substantially the same operation and effects as the foregoing embodiment.

In the foregoing embodiment, the power generation region DA has a generally rectangular shape, and the fuel gas discharge slit 354 and the oxidizing gas supply slit 440 are disposed along the first side S1 of the rectangular power generation region DA, and the fuel gas supply slit 350 and the oxidizing gas discharge slit 444 are disposed along the third side S3 thereof. However, the shape of the power generation region is not limited so, but may be an arbitrary shape. In such a case, it suffices that the fuel gas discharge slit 354 and the oxidizing gas supply slit 440 be disposed along a first portion of the peripheral border of a given shape of the power generation region, and that the fuel gas supply slit 350 and the oxidizing gas discharge slit 444 be disposed along a second portion of the peripheral border that is opposite to the first portion across the power generation region. In such a case, it is desirable that the entire area of the power generation region be contained between the first portion and the second portion. Therefore, the fuel gas and the oxidizing gas can be caused to flow in parallel with each other but in opposite directions over the entire area of the power generation region, and therefore the power generation performance of the fuel cell can be improved.

Furthermore, although the separator 600 in the embodiment is provided with the fuel gas discharge manifold 140 and the fuel gas discharge channel 640, the fuel gas discharge manifold 140 and the fuel gas discharge channel 640 may also be omitted, for example, in a completely dead end type fuel cell in which hydrogen is not discharged at all from the fuel cell. In such a case, too, the fuel gas is supplied to the power generation region DA via the fuel gas supply manifold 130 and the fuel gas supply channel 630, and flows from the third side S3 side to the first side S1 side, in accordance with the consumption of hydrogen by the power generation, so that the aforementioned counter flow can be realized and the power generation performance can be improved.

Furthermore, although in the foregoing embodiments and the like, the materials of the various members of the laminate member 800 and the various members of the separator 600 are specified, these materials are not restrictive, but various other appropriate materials can also be used. For example, although the anode-side porous body 840 and the cathode-side porous body 850 are each formed through the use of a metal porous body, it is also possible to form the anode-side porous body 840 and the cathode-side porous body 850 through the use of other materials, for example, a carbon porous body or the like. Besides, although the separator 600 is formed from a metal in the foregoing embodiments and the like, it is also possible to use other materials, such as carbon or the like, to form the separator 600.

Although in the foregoing embodiments, the separator 600 has a construction in which three layers of metal plates are stacked, and a portion corresponding to the power generation region DA has a flat surface, any other arbitrary shape may also be adopted instead of the aforementioned shape. Concretely, a separator (e.g., made of carbon) provided with groove-like reactant gas channels that are formed in a surface that corresponds to the power generation region may also be adopted, or a separator (e.g., made through the press forming of a metal sheet) having a corrugated shape that functions as reactant gas channels in portions that correspond to the power generation region may also be adopted.

Furthermore, although in the foregoing embodiment, the laminate member 800 is constructed of the power generation body 810, the anode-side diffusion layer 820, the cathode-side diffusion layer 830, the anode-side porous body 840 and the cathode-side porous body 850, this is not restrictive. For example, in the case where a separator provided with reactant gas channels or a separator having a corrugated shape that functions as reactant gas channels is used, the anode-side and cathode-side porous bodies may be omitted.

While the embodiments and the modifications of the invention have been described above, the invention is not limited by the embodiments or the modifications, but can be carried out in various manners without departing from the gist of the invention.

The invention claimed is:

1. A fuel cell comprising:
   power generation bodies each having a first electrode and a second electrode; and
   a plurality of separators stacked alternately with the power generation bodies so as to constitute the fuel cell, each separator including:
   a first surface that faces the first electrode of one of the power generation bodies;
   a second surface that faces the second electrode of another one of the power generation bodies;
   at least one first reactant gas discharge channel that is provided for discharging a first reactant gas from the first electrode facing the first surface and that extends in the separator and has, at an end of the first reactant gas channel, a discharge opening portion that is opened in the first surface; and
   a second reactant gas supply channel that is provided for supplying a second reactant gas to the second electrode facing the second surface and that extends in the separator and has, at an end of the second reactant gas channel, a supply opening portion that is opened in the second surface, wherein
   at least a portion of the discharge opening portion of the at least one first reactant gas discharge channel and at least a portion of the supply opening portion of the second reactant gas supply channel are disposed, in the separator, along substantially an entire length of a first side of a generally rectangular power generation region that faces the power generation bodies when the separator is stacked with the power generation bodies, and are positioned parallel to each other
   wherein the discharge opening portion and the supply opening portion are rectangular shaped longitudinal slits each having two equally sized long sides and two equally sized short sides, and the long sides being parallel to sides of the power generation region.

2. The fuel cell according to claim 1, wherein
   each separator further includes at least one first reactant gas supply channel that is provided for supplying the first reactant gas to the first electrode facing the first surface and that extends in the separator and has, at an end of the first reactant gas supply channel, an opening portion that is opened in the first surface and is disposed along a second side of the power generation region that is located opposite from the first side across the power generation region.

3. The fuel cell according to claim 2, wherein
   each separator further includes a second reactant gas discharge channel that is provided for discharging the second reactant gas from the second electrode facing the second surface and that extends in the separator and has, at an end of the second reactant gas discharge channel, an opening portion that is opened in the second surface and is disposed along the second side.

4. The fuel cell according to claim 1, wherein
a flowing direction in the at least one first reactant gas discharge channel is substantially perpendicular to the first side, and
a flowing direction in the second reactant gas supply channel is substantially parallel to the first side.

5. The fuel cell according to claim 1, wherein
each separator further includes a plurality of first reactant gas supply channels, and
the first reactant gas supply channels are disposed so that pressure losses of the first reactant gas supply channels become equal to each other.

6. The fuel cell according to claim 1, wherein
each separator further includes a first reactant gas discharge manifold that communicates with another end of the at least one first reactant gas discharge channel and that penetrates through the separator, and a second reactant gas supply manifold that communicates with another end of the second reactant gas supply channel and that penetrates through the separator, and
the second reactant gas supply channel has a channel width that becomes narrower with increasing distance from the second reactant gas supply manifold.

7. The fuel cell according to claim 6, wherein the opening width of the supply opening portion of the second reactant gas supply channel also becomes narrower with increasing distance from the second reactant gas supply manifold, similarly to the channel width of the second reactant gas supply channel.

8. The fuel cell according to claim 7, the fuel cell further comprising a porous body which is disposed between the second electrode of the another one of the power generation bodies and the second surface of the separator and in which the second reactant gas flows,
wherein an external shape of the porous body is formed so as to extend along the opening portion of the second reactant gas supply channel formed in the second surface.

9. The fuel cell according to claim 1, wherein
each separator further includes a first reactant gas discharge manifold that communicates with another end of the first reactant gas discharge channel and that penetrates through the separator, and a second reactant gas supply manifold that communicates with the second reactant gas supply channel and that penetrates through the separator,
the first reactant gas discharge manifold is disposed outside the power generation region, along substantially the entire length of the first side of the power generation region, and
the second reactant gas supply manifold is disposed outside the power generation region, along a third side of the power generation region adjacent to the first side.

10. The fuel cell according to claim 1, wherein
each separator has a laminate structure that includes a first plate having the first surface, a second plate having the second surface, and an intermediate plate disposed between the first plate and the second plate,
the at least one first reactant gas discharge channel is formed by a first intermediate plate penetration opening portion that penetrates through the intermediate plate and a first plate penetration opening portion that penetrates through the first plate, and
the second reactant gas supply channel is formed by a second intermediate plate penetration opening portion that penetrates through the intermediate plate and a second plate penetration opening portion that penetrates through the second plate.

11. The fuel cell according to claim 1, wherein
the first electrode is a cathode,
the second electrode is an anode,
the first reactant gas is oxidizing gas, and
the second reactant gas is fuel gas.

* * * * *

UNITED STATES PATENT AND TRADEMARK OFFICE
CERTIFICATE OF CORRECTION

| | | |
|---|---|---|
| PATENT NO. | : 8,993,188 B2 | Page 1 of 1 |
| APPLICATION NO. | : 12/523132 | |
| DATED | : March 31, 2015 | |
| INVENTOR(S) | : S. Goto | |

It is certified that error appears in the above-identified patent and that said Letters Patent is hereby corrected as shown below:

On the Title Page, at item (73) Assignee, change "Toyota Jidosha Kabushiki Kaishi" to -- Toyota Jidosha Kabushiki Kaisha --.

Signed and Sealed this
Twenty-ninth Day of December, 2015

Michelle K. Lee
*Director of the United States Patent and Trademark Office*